US012374806B2

(12) United States Patent
Xing et al.

(10) Patent No.: US 12,374,806 B2
(45) Date of Patent: Jul. 29, 2025

(54) ANTENNA AND ITS FABRICATION METHOD, AND DISPLAY DEVICE

(71) Applicant: Shanghai Tianma Micro-electronics Co., Ltd., Shanghai (CN)

(72) Inventors: Yifan Xing, Shanghai (CN); Zhenyu Jia, Shanghai (CN); Xiaonan Han, Shanghai (CN); Baiquan Lin, Shanghai (CN); Kerui Xi, Shanghai (CN); Jiayin Tang, Shanghai (CN); Qiongqin Mao, Shanghai (CN); Yifan Bao, Shanghai (CN); Zuocai Yang, Shanghai (CN); Qinyi Duan, Shanghai (CN); Aowen Li, Shanghai (CN)

(73) Assignee: Shanghai Tianma Micro-electronics Co., Ltd., Shanghai (CN)

( * ) Notice: Subject to any disclaimer, the term of this patent is extended or adjusted under 35 U.S.C. 154(b) by 245 days.

(21) Appl. No.: 18/122,455

(22) Filed: Mar. 16, 2023

(65) Prior Publication Data

US 2024/0213687 A1 Jun. 27, 2024

(30) Foreign Application Priority Data

Dec. 22, 2022 (CN) ......................... 202211657039.1

(51) Int. Cl.

| | |
|---|---|
| ***H01Q 21/06*** | (2006.01) |
| ***H01Q 1/38*** | (2006.01) |
| ***H01Q 21/00*** | (2006.01) |

(52) U.S. Cl.

CPC ........... *H01Q 21/0087* (2013.01); *H01Q 1/38* (2013.01)

(58) Field of Classification Search

CPC .... H01Q 21/0087; H01Q 1/38; H01Q 9/0407; H01Q 21/065

See application file for complete search history.

(56) References Cited

U.S. PATENT DOCUMENTS

2023/0246330 A1* 8/2023 Kim ......................... H01Q 1/38 343/700 R

2023/0422409 A1* 12/2023 Kim ....................... H01Q 1/243

* cited by examiner

*Primary Examiner* — David E Lotter

(74) *Attorney, Agent, or Firm* — Anova Law Group, PLLC

(57) ABSTRACT

An antenna and its fabrication method, and a display device are provided. The antenna includes a substrate, a radiation electrode, a first dummy electrode, and a feed line. The radiation electrode, the first dummy electrode, and the feed line are disposed on the substrate. The feed line is coupled and connected to the radiation electrode. The first dummy electrode and the radiation electrode are adjacent but not connected to each other. Along a first direction, an orthographic projection of the radiation electrode to a plane where the substrate is located is a first projection, and an orthographic projection of the first dummy electrode to the plane where the substrate is located is a second projection. There is a first interval between the first projection and the second projection; and the first direction is perpendicular to the plane where the substrate is located.

20 Claims, 24 Drawing Sheets

100

ANTENNA AND ITS FABRICATION METHOD, AND DISPLAY DEVICE

CROSS-REFERENCE TO RELATED APPLICATION

This application claims the priority of Chinese Patent Application No. 202211657039.1, filed on Dec. 22, 2022, the content of which is incorporated herein by reference in its entirety.

TECHNICAL FIELD

The present disclosure generally relates to the field of communication and display technology and, more particularly, relates to an antenna and its fabrication method, and a display device.

BACKGROUND

With the development of information technology, wireless communication technologies such as Wi-Fi and Bluetooth are combined with display devices in configurations of smartphones. Therefore, an antenna can be combined with a display device to provide a communication function.

In recent years, display screens have become more and more popular in most wireless communication electronic devices. Since the display screens have higher and higher screen-to-body ratio requirements, the arrangement of antennas in devices is often limited, and the antennas are often more likely to be blocked when the devices are in use (such as being held by hands or placed on a metal table). Therefore, performance of the antennas is compromised, and users' wireless experience is affected. For this reason, integration of the antennas in the display screens, that is, adopting a design method of antenna-on-display (AoD), has become a possible development trend of antenna design in display devices with integrated antennas.

However, in the technology of the antenna-on-display, since an antenna is set in a light emitting direction of a display screen and a radiation area of the antenna usually uses metal materials to form electrodes, a significant visual difference appears between the effective radiation area and a non-radiation area of the antenna, affecting the overall display effect of the display device.

SUMMARY

One aspect of the present disclosure provides an antenna. The antenna includes a substrate, a radiation electrode, a first dummy electrode, and a feed line. The radiation electrode, the first dummy electrode, and the feed line are disposed on the substrate. The feed line is coupled and connected to the radiation electrode. The first dummy electrode and the radiation electrode are adjacent but not connected to each other. Along a first direction, an orthographic projection of the radiation electrode to a plane where the substrate is located is a first projection, and an orthographic projection of the first dummy electrode to the plane where the substrate is located is a second projection. There is a first interval between the first projection and the second projection; and the first direction is perpendicular to the plane where the substrate is located.

Another aspect of the present disclosure provides a display device. The display device includes an antenna. The antenna includes a substrate, a radiation electrode, a first dummy electrode, and a feed line. The radiation electrode, the first dummy electrode, and the feed line are disposed on the substrate. The feed line is coupled and connected to the radiation electrode. The first dummy electrode and the radiation electrode are adjacent but not connected to each other. Along a first direction, an orthographic projection of the radiation electrode to a plane where the substrate is located is a first projection, and an orthographic projection of the first dummy electrode to the plane where the substrate is located is a second projection. There is a first interval between the first projection and the second projection; and the first direction is perpendicular to the plane where the substrate is located. The radiation electrode and the first electrode are at least disposed in a display area of the display device.

Another aspect of the present disclosure provides a fabrication method of an antenna. The method includes: providing a substrate; forming a metal layer on a side of the substrate; and processing the metal layer, to form a radiation electrode, a first dummy electrode, and a feed line.

Another aspect of the present disclosure provides a fabrication method of an antenna. The method includes: providing a substrate; forming a first metal layer on a first side of the substrate; processing the first metal layer, to form a radiation electrode and a feed line; forming a second metal layer on a second side of the substrate by reversing the substrate; and processing the second metal layer, to form a first dummy electrode.

Another aspect of the present disclosure provides a fabrication method of an antenna. The method includes: providing a first substrate and a second substrate respectively; forming a first metal layer on a first side of the first substrate, and a second metal layer on a first side of the second substrate; processing the first metal layer to form a radiation electrode and a feed line on the first substrate; processing the second metal layer to form a first dummy electrode on the second substrate; and bonding a second side of the first substrate to a second side of the second substrate.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
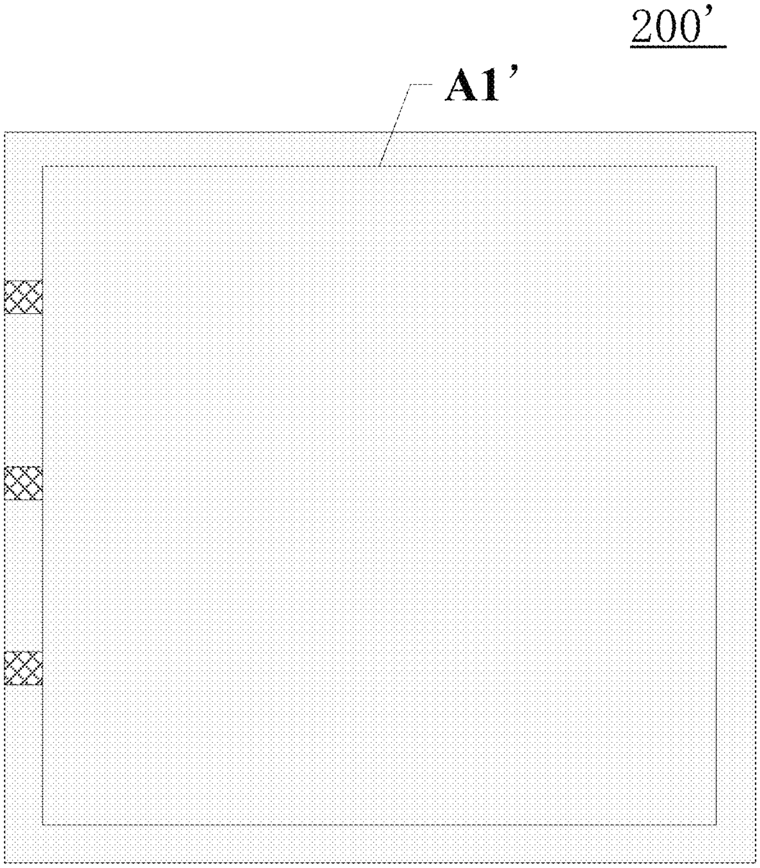
FIG. 1 illustrates a planar structure where an antenna is integrated into a display screen.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be partially exaggerated. Besides, those schematic diagrams are merely examples, and not intended to limit the scope of the disclosure. Furthermore, a threedimensional (3D) size including length, width, and depth should be considered during practical fabrication.

When an antenna is integrated into a display device, to prevent the antenna from being blocked to affect the performance, antenna-on-display technology emerges. As shown in FIG. 1 illustrating a schematic planar view of introducing the antenna into the display screen, when an antenna is placed on the display screen 100', a radiation electrode 10' of the antenna usually only covers a portion of a display area A1', and there is another portion of the display area A1' that are not blocked by the radiation electrode. When the light of the display screen passes through the area provided with the radiation electrode 10' and the area without the radiation electrode 10', there will be visual differences in the display device, and especially shadows will appear on the edge of the radiation electrode, which will affect the display effect.

The present disclosure provides an antenna and its fabrication method, and a display device. The antenna may include: a substrate, a radiation electrode, a first dummy electrode, and a feed line. The radiation electrode, the first dummy electrode, and the feed line may be disposed on the substrate. The feed line may be coupled and connected to the radiation electrode. The first dummy electrode and the radiation electrode may be adjacent to each other but not connected. Along a first direction, an orthographic projection of the radiation electrode to a plane where the substrate is located may be a first projection, and an orthographic projection of the first dummy electrode to the plane where the substrate is located may be a second projection. There may be a first interval between the first projection and the second projection, and the first direction may be perpendicular to the plane where the substrate is located. When the first dummy electrode is introduced in a non-radiation area, the light from the display panel in the display device may pass through the radiation electrode disposed in the radiation area and the first dummy electrode disposed in the non-radiation area, when it is incident on the light-emitting surface of the display device. Therefore, the visual difference between the radiation area and the non-radiation area may be reduced, and the shadow on the edge of the radiation electrode may be weakened, to avoid the problem that the edge of the radiation electrode may be visible when the antenna is applied to a display device and improve the overall display effect of the display device.

Figure 2:
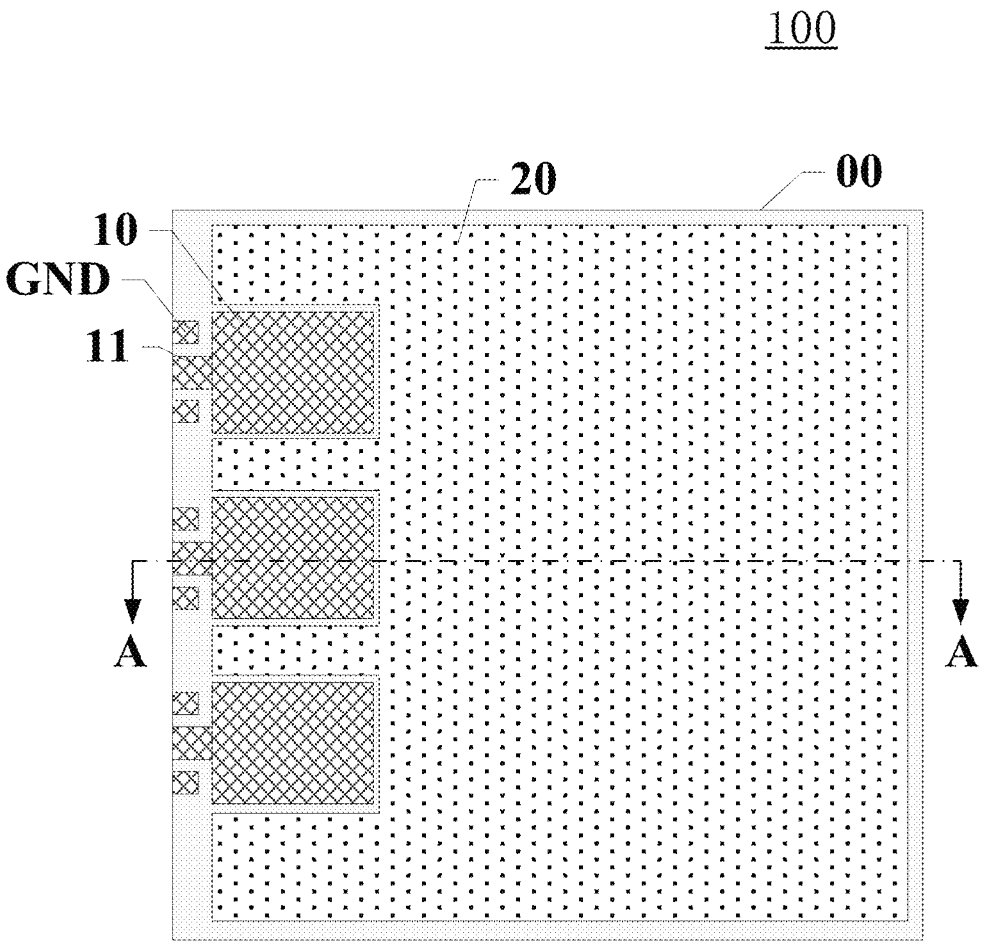
FIG. 2 illustrates a planar structure of an exemplary antenna consistent with various disclosed embodiments of the present disclosure.

The present disclosure provides an antenna. In one embodiment as shown in FIG. 2 which is a planar structure of an antenna and FIG. 3 which is an arrangement of radiation electrodes 10 and adjacent first dummy electrode 20 in the antenna shown in FIG. 2, the antenna 100 may include: a substrate 00, radiation electrodes 10, a first dummy electrode 20, and feed lines 11. The radiation electrodes 10, the first dummy electrode 20, and the feed lines 11 may be disposed on the substrate. One of the feed lines 11 may be coupled and connected to a corresponding one of the radiation electrodes 10.

The first dummy electrode 20 may be adjacent to the radiation electrodes 10 but not connected. Along a first direction, an orthographic projection of one of the radiation electrodes 20 to a plane where the substrate 00 is located may be a first projection, and an orthographic projection of the first dummy electrode 20 to the plane where the substrate is located may be a second projection. There may be a first interval between the first projection and the second projection, and the first direction may be perpendicular to the plane where the substrate 00 is located.

In FIG. 2, the radiation electrodes 10 and the first dummy electrode 20 are filled with different patterns to better distinguish the radiation electrodes 10 and the first dummy electrode 20, and the film layer and material of the radiation electrodes 10 and the first dummy electrode 20 are not limited.

Figure 3:
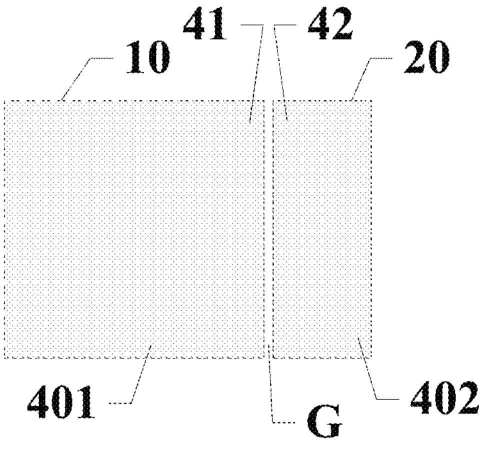
FIG. 3 illustrates an arrangement of a radiation electrode and an adjacent first dummy electrode in FIG. 2 consistent with various disclosed embodiments of the present disclosure.

The embodiment shown in FIG. 2 where the antenna includes multiple radiation electrodes 10 is used as an example to illustrate the present disclosure, and does not limit the scope of the present disclosure. The actual number of the radiation electrodes 10 in the antenna is not limited. In one embodiment, the radiation electrodes 10 may have grid structures composed of intersecting lines. When the antenna is applied to the display device and the antenna is disposed on the light-emitting surface of the display panel, the lines in the radiation electrodes 10 and sub-pixels in the display panel may be in a relationship of mutual dislocation along the direction perpendicular to the display panel, or in a relationship of overlapping projections. Optionally, an aperture ratio of the radiation electrodes 10 with the grid structure may be larger than or equal to 92%. Therefore, for the radiation electrodes 10 with the grid structure, when there is a projection overlap between the lines and the sub-pixels, it may be difficult for human eyes to perceive, and may have less influence on the light emitting of sub-pixels. Optionally, when the first dummy electrode 20 adjacent to the radiation electrodes 10 is introduced into the antenna, the first dummy electrode 20 may be also embodied as a grid structure composed of cross lines. Similarly, the lines in the first dummy electrode 20 and the sub-pixels in the display panel may be in a relationship of mutual dislocation in the direction perpendicular to the display panel, or can be in a relationship of overlapping projections. For the first dummy electrode with the grid structure, as far as the first dummy electrode 20 is concerned, even if there is projection overlap between the lines and the sub-pixels, it may have little influence on the light emission of the sub-pixels. The embodiment in FIG. 2 and FIG. 3 only illustrates one form of the grid of the radiation electrodes 10 and the first dummy electrode 20, and does not limit the actual shape and size of the grid. FIG. 3 only illustrates part of the sub-grids in the radiation electrodes 10 and the first dummy electrode 20, and does not represent the actual number of sub-grids contained in the radiation electrodes 10 and the first dummy electrode 20.

In one embodiment, the antenna may further include ground terminals GND, and the ground terminals GND may be located on two sides of the feed lines 11. In one embodiment, one of the feed lines 11 may be coupled and connected to a corresponding one of the radiation electrodes 10, and radio frequency signals may be sent and received through the feed line 11 to the corresponding radiation electrode 10 coupled to the feed line 11. In addition to the radiation electrodes 10, the antenna in the embodiment of the present disclosure also includes the first dummy electrode 20. An area where the radiation electrodes 10 are located may be an effective radiation area, and an area where the first dummy electrode 20 is located may be a non-radiation area. That is, the first dummy electrode 20 may be disposed in the non-radiation area, and there may be a first interval G between the first dummy electrode 20 and the radiation electrodes 10. The first dummy electrode 20 and the radiation electrodes 10 may be mutually insulated, and the first dummy electrode 20 may not play a role in radiation. When the first dummy electrode 20 is introduced into the non-radiation area and the antenna is applied to the display device, the radiation electrodes 10 and the first dummy electrode 20 in the antenna may be distributed throughout the entire display area of the display device. When the antenna includes the radiation electrodes but no first dummy electrode is provided, when the light of the display panel passes through an area provided with the radiation electrodes and another area not provided with the radiation electrodes, because of the film difference between the radiation area and the non-radiation area, the difference in transmittance between the radiation area and the non-radiation area may result in a relatively obvious shadow in the edge area of the radiation electrodes. In this embodiment, the first dummy electrode 20 may be introduced on the periphery of the radiation electrodes 10, such that the type and quantity of the film layer in the radiation area and the non-radiation area may be consistent. That is, the types of film layers in different areas of the display area of the display device may be consistent. Therefore, when the light from the display panel in the display device is incident on the light-emitting surface of the display device, it may pass through the radiation electrodes 10 arranged in the radiation area and the first dummy electrode 20 arranged in the non-radiation area, which reduces the difference in transmittance between the radiation area and the non-radiation area. The visual difference between the radiation area and the non-radiation area may be reduced, weakening the shadow on the edge of the radiation electrodes 10 and avoiding the problem that the edge of the radiation electrodes 10 is visible when the antenna is applied to the display device. The overall display effect of the display device may be improved.

In one embodiment, the radiation electrodes 10 and the first dummy electrode 20 may be made of metal materials, such as copper, aluminum, silver, gold, etc., and may also be made of alloy materials with low square resistance such as silver-palladium-copper, to improve the radiation efficiency of the radiation electrodes 10.

Figure 4:
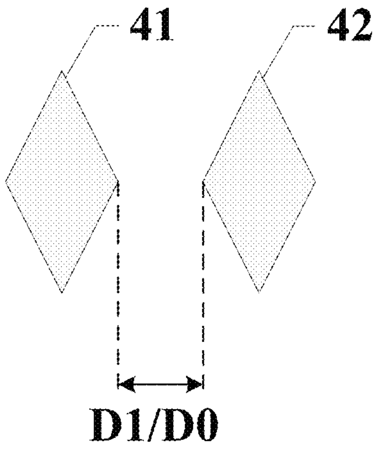
FIG. 4 illustrates an arrangement of a first sub mesh in the radiation electrode and a second sub mesh in the first dummy electrode consistent with various disclosed embodiments of the present disclosure.

As shown in FIG. 2, FIG. 3, and FIG. 4 which is a schematic arrangement of first sub-grids 41 in the radiation electrodes 10 and second sub-grids 42 in the first dummy electrode 20, in one embodiment, one radiation electrode 10 of the radiation electrodes 10 may include a plurality of first grids 401, and one first grid 401 of the plurality of first grids 401 may include a plurality of first sub-grids 41 adjacent to the first dummy electrode 20. The first dummy electrode 20 may include a plurality of second grids 402, and one second grid 402 of the plurality of second grids 402 may include a plurality of second sub-grids 42 adjacent to the radiation electrodes 10. Along the arrangement direction of the radiation electrodes 10 and the first dummy electrode 20, a distance between one of the plurality of first sub-grids 41 and a corresponding one of the plurality of second sub-grids 42 may be D1, and a distance between two adjacent first grids 401 in the radiation electrode 10 may be D2, wherein D1>D2.

FIG. 3 and FIG. 4 only illustrate the radiation electrodes 10 and the first dummy electrode 20, and do not limit the number of sub-grids contained in the first grid 401 corresponding to one same radiation electrode 10, nor do they limit the number of sub-grids contained in the first dummy electrode 20. Also, and the size of the sub-grids in the first grids 401 and the second grids 402 is not limited.

When the first dummy electrode 20 is arranged adjacent to one radiation electrode 10, one first sub-grid 41 in the radiation electrode 10 may be adjacent to a corresponding second sub-grid 42 in the first dummy electrode 20, and one second sub-grid 42 in the first dummy electrode 20 may be adjacent to a corresponding first sub-grid 41 in the radiation electrode 10. The distance D1 between the first sub-grid 41 and the corresponding second sub-grid 42 may be, along the arrangement direction of the radiation electrode 10 and the first dummy electrodes 20 (that is, along the arrangement direction of the first sub-grid 41 and its adjacent second sub-grid 42), a minimum distance between an edge of the first sub-grid 41 facing the corresponding second sub-grid 42 and the edge of the corresponding second sub-grid 42 towards the first sub-grid 41. The distance D2 between two adjacent first grids 401 may be, along the arrangement direction of the radiation electrode 10 and the first dummy electrode 20, a distance between two adjacent endpoints of the adjacent two first sub-grids 41. In this embodiment, the two adjacent end points of the two adjacent first sub-grids 41 may be connected to each other, that is, D2=0.

In the present embodiment, the distance D1 between the first sub-grid 41 and the corresponding second sub-grid 42 may be larger than 0, that is, there may be a certain distance between the radiation electrodes 10 and the first dummy electrode 20, to prevent the first dummy electrode 10 from coupling a portion of the radio frequency signal of the radiation electrodes 10 because of a too small distance between the radiation electrodes 10 and the first dummy electrode 20. The radiation efficiency may not be affected.

As shown in FIG. 3 and FIG. 4, in one embodiment, along the arrangement direction of the adjacent radiation electrodes 10 and the first dummy electrode 20, a minimum width of the first interval may be D0, where 3 μm≤D0≤10 μm.

When the first dummy electrode 20 adjacent to the radiation electrodes 10 is introduced into the antenna, optionally, the first dummy electrode 20 may be arranged outside the radiation electrode 10. Along the arrangement direction of the radiation electrodes 10 and the first dummy electrode 20, when the minimum width D0 of the first interval between the first dummy electrode 20 and the radiation electrodes 10 is too small, for example, is less than 3 μm, the distance between the first dummy electrode 20 and the radiation electrodes 10 may be too small, and the radio frequency signal of the radiation electrodes 10 may be likely to be coupled to the first dummy electrode 20, resulting in a decrease in the radiation efficiency of the radiation electrodes 10. When the minimum width of the first interval G between the first dummy electrode 20 and the radiation electrodes 10 is relatively large, for example, is larger than 10 μm, there may be still some visual problems in the area between the radiation electrodes 10 and the first dummy electrode 20, for example, in the edge of the radiation electrodes 10 adjacent to the first dummy electrode 20 and the edge of the first dummy electrode 20 adjacent to the radiation electrodes 10. Therefore, in the embodiments of the present disclosure, the minimum width of the first interval G between the radiation electrodes 10 and the first dummy electrode 20 may be set to about 3 μm to 10 μm. Therefore, the radiation efficiency of the radiation electrodes 10 may be prevented from being too small induced by the too small distance between the first dummy electrode 20 and the radiation electrodes 10, and also the visual difference between the radiation area and the non-radiation area on the antenna may be reduced to weaken the edge shadow of the radiation electrodes 10. When the antenna is applied to the display screen, the problem that the edge of the radiation electrodes 10 is visible may be alleviated.

Optionally, the minimum width of the first interval may satisfy: 4 μm≤D0≤6 μm, or 5 μm≤D0≤9 μm, or 6 μm≤D0≤8 μm, etc., which is not specifically limited in the present disclosure.

In another embodiment shown in FIG. 3 and FIG. 4, the radiation electrode 10 may include a plurality of first sub-grids 41 adjacent to the first dummy electrode 20, and the first dummy electrode 20 may include a plurality of second sub-grids 42 adjacent to the radiation electrode 10. One first sub-grid 41 of the plurality of first sub-grids 41 may include V1 vertices and E1 edges, and one second sub-grid 42 of the plurality of second sub-grids 42 may include V2 vertices and E2 edges, where $$V1-E1=V2-E2.$$

The embodiment in FIG. 4 where the first sub-grid 41 and the second sub-grid 42 are diamond is used as an example only to illustrate the present disclosure, and does not limit the scope of the present disclosure. In various embodiments, the first sub-grid 41 and the second sub-grid 42 may have some other suitable shapes, as long as V1–E1=V2–E2.

When the shapes of the first sub-grid 41 and the second sub-grid 42 are diamond, V1=4, E1=4, V2=4, E2=4. Assuming that in a polygon structure, the difference between the number of vertices and the number of sides represents the first parameter of the polygon structure. In the antenna provided by the embodiments of the present disclosure, the radiation electrode 10 and the first dummy electrode 20 may each have a topological grid structure. In the radiation electrode 10 and the first dummy electrode 20, when parameters of the first sub-grid 41 and the second sub-grid 42 are consistent, the visual difference between the first sub-grid 41 and the second sub-grid 42 may be better compensated, thereby helping to weaken the edge shadow of the radiation electrode 10 and improving the display uniformity of the display device when the antenna is applied to the display device.

Figure 5:
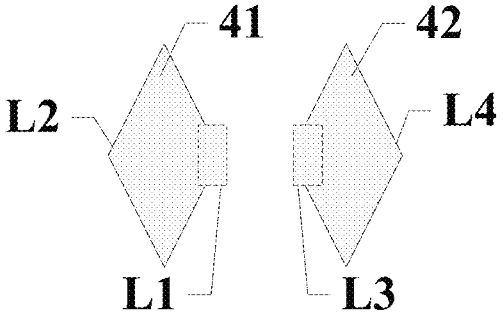
FIG. 5 illustrates another arrangement of a first sub mesh in the radiation electrode and a second sub mesh in the first dummy electrode consistent with various disclosed embodiments of the present disclosure.

FIG. 5 shows a schematic diagram of the arrangement of the first sub-grids 41 in the radiation electrode 10 and the second sub-grids 42 in the first dummy electrode 20. As shown in FIG. 3 and FIG. 5, in an optional embodiment, the radiation electrode 10 may include a plurality of first sub-grids 41 arranged adjacent to the first dummy electrode 20, and the first dummy electrode 20 may include a plurality of second sub-grids 42 arranged adjacent to the radiation electrode 10. One first sub-grid 41 of the plurality of first sub-grids 41 may include a first sub-section L1 and at least one second sub-section L2 connected to the first sub-section L1. The at least one second sub-section L2 may be located on the side of the first sub-section L1 away from a corresponding second sub-grid 42. One second sub-grid 42 of the plurality of second sub-grids 42 may include a third sub-section L3 and at least one fourth sub-section L4 connected to each other. The at least one fourth sub-section L4 may be located on the side of the third sub-section L3 away from the first sub-grid 41. The first sub-section L1 may be adjacent to the third sub-section L3, and the first interval may be the interval between the first sub-section L1 and the third sub-section L3.

In the embodiment shown in FIG. 5, the first sub-grid 41 and the second sub-grid 42 may have diamond-like structures which is achieved by slightly changing the diamond shape. Optionally, As shown in FIG. 2 and FIG. 5, the shapes of other sub-grids 401 other than the first sub-grid 41 in the radiation electrode 10 may be the same as the shape of the first sub-grid 41, all of which may be diamond. In the first dummy electrode 20, other sub-grids 402 other than the second sub-grid 42 may have the same shape as the first sub-grid 41, and they may be all diamond-shaped.

Specifically, in the embodiment shown in FIG. 5, the first sub-section L1 in the first sub-grid 41 of the radiation electrode 10 may be two sub-sections corresponding to the vertex of the diamond first sub-grid 41 adjacent to the second sub-grids 42. The second sub-section L2 may be other sub-sections except the first sub-section L1 in the first sub-grid 41 of the diamond structure. The third sub-section L3 of the second sub-grid 42 in the first dummy electrode 20 may be a sub-section in the diamond-like structure adjacent to the first sub-grid 41 and recessed toward the second sub-grid 42. The fourth sub-section L4 may be other sub-sections in the diamond-like structure except the third sub-section L3.

In the first sub-grid 41 and the second sub-grid 42 arranged adjacently, the first sub-section L1 and the third sub-section L3 may be adjacent. In the embodiment of the present disclosure, the first interval between the adjacent radiation electrode 10 and the first dummy electrode 20 may be an interval between the first sub-section L1 and the third sub-section L3. Optionally, in this embodiment, the third sub-section L3 adjacent to the first sub-grid 41 in the second sub-grid 42 may be configured to be a concave structure toward the inside of the second sub-grid 42. Therefore, on the premise of avoiding the visible edge of the radiation electrode 10, the width of the first interval between the radiation electrode 10 and the first dummy electrode 20 may be increased, thereby reducing or avoiding coupling of the radio frequency signal on the radiation electrode 10 from the first dummy electrode 20. The radiation efficiency of the radiation electrode 10 may be improved.

As shown in FIG. 3, other sub-grids in the first grids 401 other than the first sub-grids 41 corresponding to the radiation electrode 10, and other sub-grids in the second grid 402 other than the second sub-grids 42 corresponding to the first dummy electrode 20, may have consistent shapes and sizes, to reduce the visual difference between the first grids 401 and the second grids 402 and improve the display uniformity of the display device when the antenna is applied to the display device.

In one embodiment, the shape of the first sub-section L1 may be fitted or symmetrical to the shape of the third sub-section L3.

As shown in FIG. 5, that the shape of the first sub-segment L1 is fitted with the shape of the third sub-segment L3 may be that the first sub-grid 41 corresponding to the radiation electrode 10 has a protrusion and the second sub-grid 42 corresponding to the adjacent first dummy electrode 20 has a recession. When the first sub-grid 41 is translated to the direction where the second sub-grid 42 is located, the protrusion of the first sub-grid 41 may be able to be fitted with the recession of the second sub-grid 42. For example, when the shape of the first sub-grid 41 is a rhombus, and the shape of the second sub-grid 42 may be a rhombus-like structure in which a sharp corner adjacent to the first sub-grid 41 us recessed, where the shape of the first sub-section L1 and the shape of the third sub-section L3 may be embodied in a form of fitting.

Figure 6:
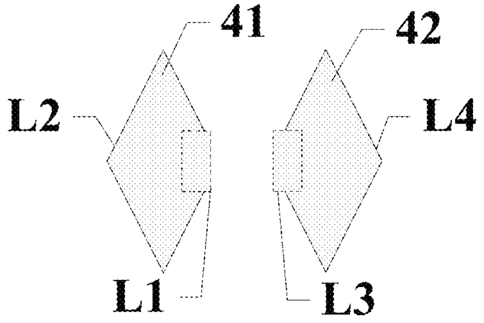
FIG. 6 illustrates another arrangement of a first sub mesh in the radiation electrode and a second sub mesh in the first dummy electrode consistent with various disclosed embodiments of the present disclosure.

FIG. 6 is a schematic diagram showing another arrangement of the first sub-grid 41 in the radiation electrode 10 and the second sub-grid 42 in the first dummy electrode 20. As shown in FIG. 3 and FIG. 6, in another embodiment, the shape of the first sub-grid 41 may be a rhombus-like structure, and its first sub-section L1 may be a sub-section adjacent to the second sub-grid 42 and concave to the inside of the first sub-grid 41. The second sub-grid 42 may be also a rhombus-like structure, and its second sub-section L2 may be a sub-section adjacent to the first sub-grid 41 and recessed to the inside of the second sub-grid 42. Therefore, the adjacent first sub-grid 41 and second sub-grid 42 may be symmetrically distributed, and the first sub-section L1 in the first sub-grid 41 and the third sub-section L3 in the second sub-grid 42 may be also symmetrically distributed.

In the present embodiment, the shape of the first sub-section L1 in the first sub-grid 41 and the shape of the third sub-section L3 in the second sub-grid 42 may be configured to be fitted or be symmetrical. That is, the shapes corresponding to the grids in the radiation electrode and the shapes corresponding to the grids of the first dummy electrode 20 may be fitted. When the antenna is applied to the display device and the light emitted by the display screen passes through the radiation electrode 10 and the first dummy electrode 20, there may be no significant difference that is able to be visually observed, between the radiation area where the radiation electrode 10 is located and the non-radiation area where the first dummy electrode 20 is located. The display effect of the display device may be improved.

Further, when the shape of the first sub-section L1 in the first sub-grid 41 and the shape of the third sub-section L3 in the second sub-grid 42 is configured to be fitted or be symmetrical, the width of the first interval between the radiation electrode 10 and the first dummy electrode 20 may be ensured, thereby helping to reduce or avoid the coupling of the first dummy electrode 20 to the radio frequency signal on the radiation electrode 10. Therefore, when the first dummy electrode 20 is introduced to weaken the edge shadow of the radiation electrode 10, it may not affect the radiation efficiency of the radiation electrode 10.

Figure 7:
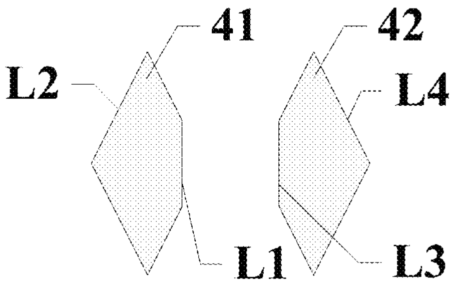
FIG. 7 illustrates another arrangement of a first sub mesh in the radiation electrode and a second sub mesh in the first dummy electrode consistent with various disclosed embodiments of the present disclosure.

FIG. 7 is a schematic diagram showing another arrangement of the first sub-grid 41 in the radiation electrode 10 and the second sub-grid 42 in the first dummy electrode 20. This embodiment shows another shape of the first sub-grid 41 and the adjacent second sub-grid 42.

As shown in FIG. 3 and FIG. 7, in another embodiment, the first sub-section L1 and the third sub-section L3 may be straight line segments parallel to each other. Specifically, when the first sub-section L1 in the first sub-grid 41 and the total third sub-section L3 of the second sub-grid 42 are configured as straight line segments parallel to each other, the first sub-grid 41 and the second sub-grid 42 may also show a symmetrical structure, to weaken the edge shadow of the radiation electrode 10. Moreover, when the first sub-section L1 and the third sub-section L3 are configured as straight segments, the distance between the radiation electrode 10 and the first dummy electrode 20 is able to be better controlled, avoiding the visible edge of the radiation electrode 10 and reducing the coupling of the first dummy electrode 20 on the radio frequency signal of the radiation electrode 10. Further, when both the first sub-section L1 and the second sub-section L2 are configured as straight line segments, the structure of the first sub-grid 41 and the second sub-grid 42 may be simplified, to reduce the production process of the antenna and improve the antenna production efficiency.

As shown in FIG. 4, FIG. 5, and FIG. 6, in one embodiment, both the first sub-section L1 and the third sub-section L3 may be configured as polyline segments. Specifically, when the first sub-section L1 in the first sub-grid 41 and the third sub-section L3 in the second sub-grid 42 are polyline segments, the first sub-section L1 and the third sub-section can be L3 may be configured to have a fitting or symmetrical form, to reduce the visual difference between the first sub-grid 41 and the second sub-grid 42 and weaken the visible edge shadow of the radiation electrode 10.

Figure 8:
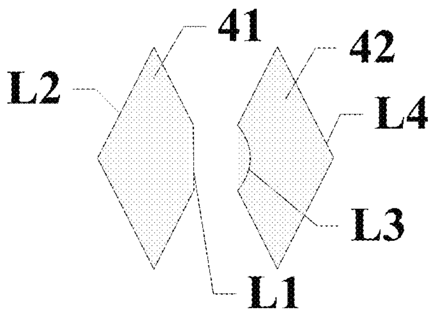
FIG. 8 illustrates another arrangement of a first sub mesh in the radiation electrode and a second sub mesh in the first dummy electrode consistent with various disclosed embodiments of the present disclosure.
Figure 9:
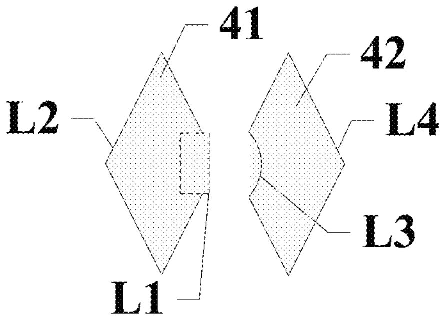
FIG. 9 illustrates arrangement of a first sub mesh in the radiation electrode and a second sub mesh in the first dummy electrode consistent with various disclosed embodiments of the present disclosure.
Figure 10:
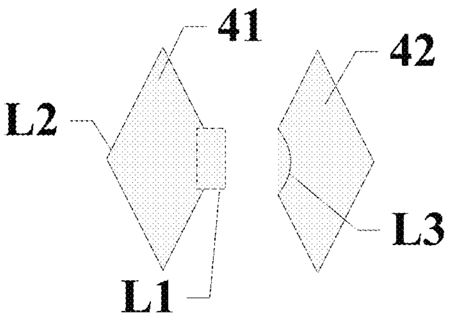
FIG. 10 illustrates another arrangement of a first sub mesh in the radiation electrode and a second sub mesh in the first dummy electrode consistent with various disclosed embodiments of the present disclosure.

FIG. 8, FIG. 9 and FIG. 10 respectively show another arrangement schematic diagram of the first sub-grid 41 in the radiation electrode 10 and the second sub-grid 42 in the first dummy electrode 20. In one embodiment, the first sub-section L1 may be a straight line segment or a polyline segment, and the third sub-section L3 may be an arc segment concave toward the center of the second sub-grid 42.

Specifically, in one embodiment shown in FIG. 8, the first sub-section L1 may be configured as a straight line segment and the third sub-section L3 may be configured as a arc segment concave towards the center of the second sub-grid 42. In other embodiments shown in FIG. 9 and FIG. 11, the first sub-section L1 may be configured as a polyline segment, and the third sub-section L3 may be configured as a arc segment concave towards the center of the second sub-grid 42. In the embodiment shown in FIG. 9, the first sub-section L1 may be configured as a polyline segment concave towards the center of the first sub-grid 41. In another embodiment shown in FIG. 11, the first sub-section L1 may be configured as a polyline segment protruding toward the direction of the second sub-grid 42. In these embodiments, the third sub-section L3 may be recessed towards the center of the second sub-grid 42, that is to say, the third sub-section L3 may be configured away from the first sub-section L1. Therefore, the width of the first interval between the first sub-section L1 and the second sub-section L2 may be increased, to avoid or reduce the coupling of the first dummy electrode 20 on the radio frequency signal on the radiation electrode 10 and ensure the radiation efficiency of the radiation electrode 10 after the first dummy electrode 20 is introduced into the antenna.

Figure 11:
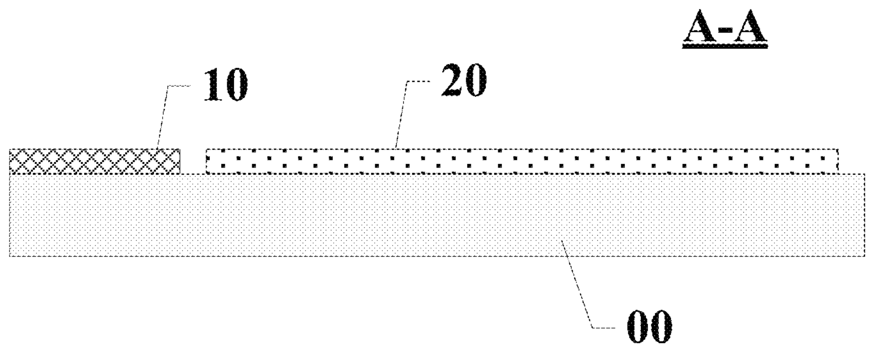
FIG. 11 illustrates a schematic of film layers along an AA direction of the antenna in FIG. 2 consistent with various disclosed embodiments of the present disclosure.

FIG. 11 is a schematic diagram of film layers of the antenna along an AA direc2. n in FIG. 2.

As shown in FIG. 9, in one embodiment, both the radiation electrode 10 and the first dummy electrode 20 may be located on a first side of the substrate 00.

Specifically, in the present embodiment, both the radiation electrode 10 and the first dummy electrode 20 in the antenna may be arranged on a same side of the substrate 00. Therefore, when the antenna is actually manufactured, a metal layer may be deposited on a same side of the substrate 00, and then the radiation electrode 10 and the first dummy electrode 20 may be formed simultaneously by processing the metal layer without introducing different manufacturing processes for the radiation electrode 10 and the first dummy electrode 20. Correspondingly, by disposing the radiation electrode 10 and the first dummy electrode 20 on the same side of the substrate 00, the manufacturing efficiency of the antenna may be improved.

Optionally, as shown in FIG. 2 and FIG. 11, the feed line 11 may be located on the same side of the substrate 00 as the radiation electrode 10 and the first dummy electrode 20, such that the feed line 11 and the first dummy electrode 20 may be formed at the same time.

Figure 12:
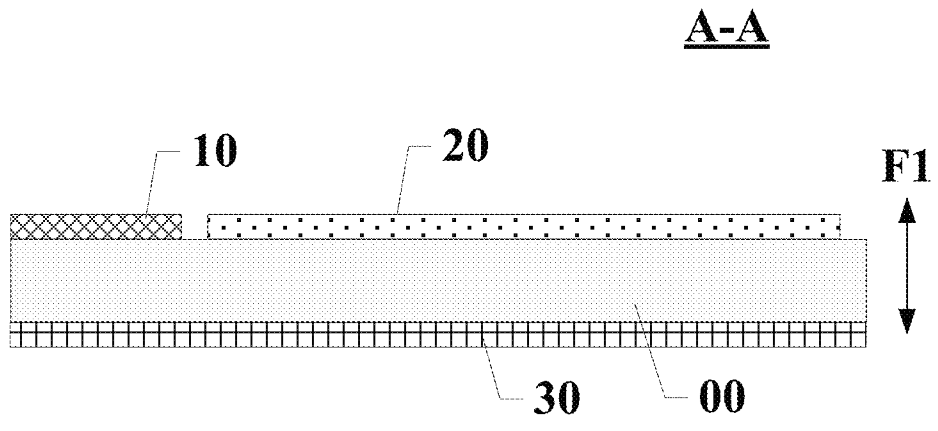
FIG. 12 illustrates another schematic of film layers along an AA direction of the antenna in FIG. 2 consistent with various disclosed embodiments of the present disclosure.
Figure 13:
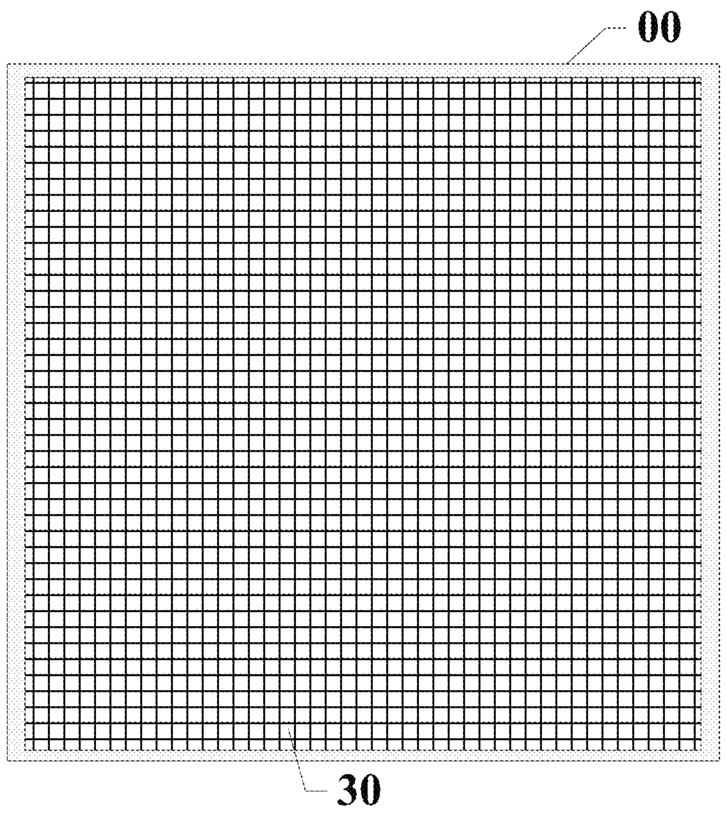
FIG. 13 illustrates a planar structure of a second dummy electrode consistent with various disclosed embodiments of the present disclosure.

FIG. 12 shows another schematic diagram of film layers of the antenna provided in FIG. 2 along the AA direction, and FIG. 13 is a schematic plan view of the second dummy electrode 30. In the present embodiment shown in FIG. 12 and FIG. 13, a second dummy electrode may be introduced into the antenna 30.

In the present embodiment shown in FIG. 12 and FIG. 13, the antenna may further include a second dummy electrode 30 on a second side of the substrate 00, and the first side and the second side are opposite along the first direction F1. The first direction F1 may be a direction perpendicular to the plane where the substrate 00 is located.

Specifically, in the present embodiment, the radiation electrode 10 and the first dummy electrode 20 may be disposed on the first side of the substrate 00, and the second dummy electrode 30 may be disposed on the second side of the substrate 00. Assuming that the area where the radiation electrode 10 is located is the radiation area and the area where the first dummy electrode 20 is located is the non-radiation area, optionally, when the second dummy electrode 30 is introduced on the second side of the substrate 00, the second dummy electrode 30 may be distributed in the radiation area and the non-radiation area.

When the dummy electrode is introduced into the antenna and the dummy electrode and the radiation electrode are respectively arranged on two sides of the substrate, assuming that the radiation electrode is located on the upper surface of the substrate and the dummy electrode is located on the lower surface of the substrate, when the ambient light arrives at the upper surface of the antenna, because of the difference in reflectivity between the metal radiation electrode and the substrate, the reflectivity of the area with the radiation electrode on the upper surface and the area without the radiation electrode may be different, which may cause the area with the radiation electrode and the area without the radiation electrode to be inhomogeneous in brightness. Therefore, the present embodiment may also introduce a dummy electrode on the upper surface of the substrate (the surface on the same side as the radiation electrode). That is, the dummy electrodes may be disposed on both surfaces of the substrate. One of the dummy electrodes on the same side of the substrate as the radiation electrode may be the first dummy electrode, and another dummy electrode on the different side of the substrate from the radiation electrode may be the second dummy electrode. In this way, when the antenna is applied to the display device and the antenna is arranged on the light-emitting surface of the display panel, since the first dummy electrode 20 and the radiation electrode 10 are arranged on the same side surface of the substrate, and the second dummy electrode 30 is arranged on the radiation area and the non-radiation area of the other side surface of the substrate, the first dummy electrode 20 and the radiation electrode 10 may have similar reflectivity to ambient light when the ambient light irradiates the antenna. Therefore, the reflectance of the radiation area and the non-radiation area may be as consistent as possible, to reduce the inhomogeneous brightness and darkness caused by the difference in reflectance in different areas.

As shown in FIG. 12, in one optional embodiment, the first dummy electrode 20 may be floating, and the second dummy electrode 30 may receive a fixed potential signal.

When the first dummy electrode 20 and the second dummy electrode 30 are respectively introduced on two sides of the substrate 00, in this embodiment, the first dummy electrode 20 disposed on the same side as the radiation electrode 10 may be floating, and the second dummy electrode 30 disposed on a side different from the radiation electrode 10 may receive a fixed potential signal. Therefore, while avoiding uneven brightness caused by different reflectance in different regions, the second dummy electrodes 30 may receive the fixed potential signal, such that the radiation between the discontinuous radiation electrodes 30 arranged on the same layer may be enhanced, to reduce the amount of radiation loss.

Optionally, the fixed potential signal received by the second dummy electrode 30 may be a ground signal, or a negative constant voltage signal, or a constant voltage signal with a small voltage value, which is not specifically limited in the present disclosure. To further enhance the radiation performance between the discontinuous radiation electrodes 10, the fixed potential signal may be configured as the ground signal.

Figure 14:
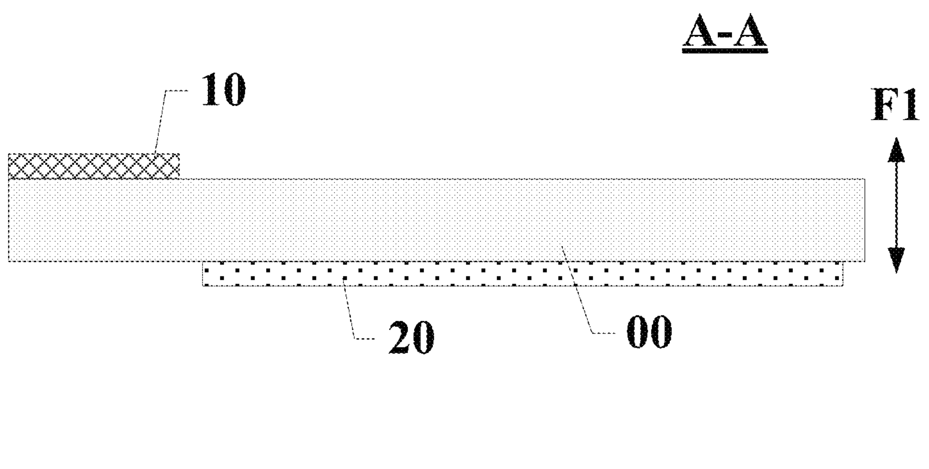
FIG. 14 illustrates another schematic of film layers along an AA direction of the antenna in FIG. 2 consistent with various disclosed embodiments of the present disclosure.

FIG. 14 is another schematic diagram of film layers of the antenna along the AA direc2.on in FIG. 2.

In one embodiment shown in FIG. 14, the radiation electrode 10 may be located on the first side of the substrate 00, and the first dummy electrode 20 may be located on the second side of the substrate 00, where the first side and the second side may be opposite along the first direction F1.

When the width of the first interval between the radiation electrode 10 and the first dummy electrode 20 is set to be 10 μm or less, it may be ensured that the edge of the radiation electrode 10 is invisible. When the radiation electrode 10 and the first dummy electrode 20 are disposed in the same layer, if the width of the first interval between the radiation electrode 10 and the first dummy electrode 20 is set smaller, the first dummy electrode 20 may couple the radio frequency signal of the radiation electrode 10, which may cause the radiation loss of the radiation electrode 10. Therefore, in the present embodiment, the radiation electrode 10 and the first dummy electrode 20 may be disposed on opposite sides of the substrate 00 respectively. Correspondingly, the distance of the first interval between the radiation electrode 10 and the first dummy electrode 20 may be precisely controlled to weaken the edge shadow of the radiation electrode 10, and the coupling of the first dummy electrode 20 to the radio frequency signal on the radiation electrode 10 may be reduced, thereby reducing the radiation loss of the radiation electrode 10.

Figure 15:
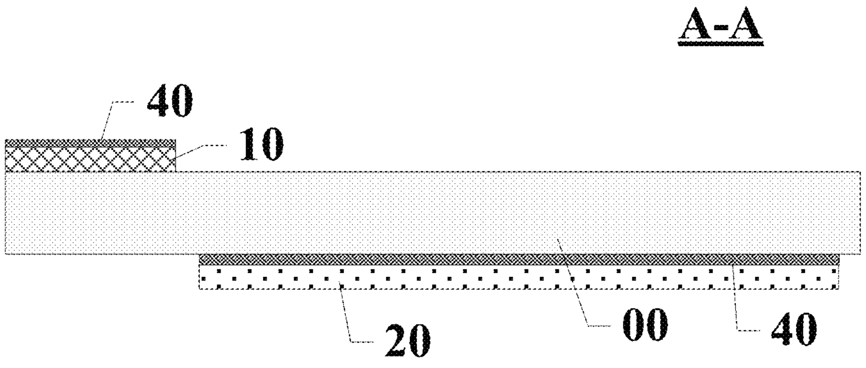
FIG. 15 illustrates another schematic of film layers along an AA direction of the antenna in FIG. 2 consistent with various disclosed embodiments of the present disclosure.

FIG. 15 is another schematic diagram of film layers of the antenna along the AA dire2.on in FIG. 2.

In one embodiment shown in FIG. 15, a side of the radiation electrode 10 away from the substrate 00 and a side of the first dummy electrode 20 close to the substrate 00 may be both provided with reflective layers 40.

Specifically, when the antenna is applied to a display device, the radiation electrode 10 may be closer to the light emitting surface of the display device than the first dummy electrode 20. The side of the substrate 00 of the antenna facing the light emitting surface of the display device may be provided with the radiation electrode 10 and the first dummy electrode 20 is not provided in the non-radiation area on the side of the substrate 00 facing the light-emitting surface of the display device. Since the materials and reflectivity of the substrate 00 of the antenna is different from the materials and reflectivity of the radiation electrode 10, when the ambient light hits the antenna, there may be uneven brightness and darkness in the radiation area and the non-radiation area. Therefore, in the present embodiment, the reflective layers 40 may be provided on the side of the radiation electrode 10 away from the substrate 00 and the side of the first dummy electrode 20 close to the substrate 00. When ambient light irradiates the antenna, the reflective layers 40 in the radiation area and the non-radiation area may be able to reflect the light, such that human eyes may not be able to perceive the difference in brightness between the radiation area and the non-radiation area or the human eye may only be able to perceive weaker changes in light and shade. Therefore, the brightness difference between the radiation area and the non-radiation area may be avoided, to improve the overall display effect and visual experience.

Optionally, the reflective layers 40 may be made of a material with high reflectivity, such as molybdenum or silver. Optionally, to reduce the impact on radiation as much as possible, the reflective layers 40 may be as thin as possible, and the thickness of the reflective layers may be 30 nm-100 nm.

Figure 16:
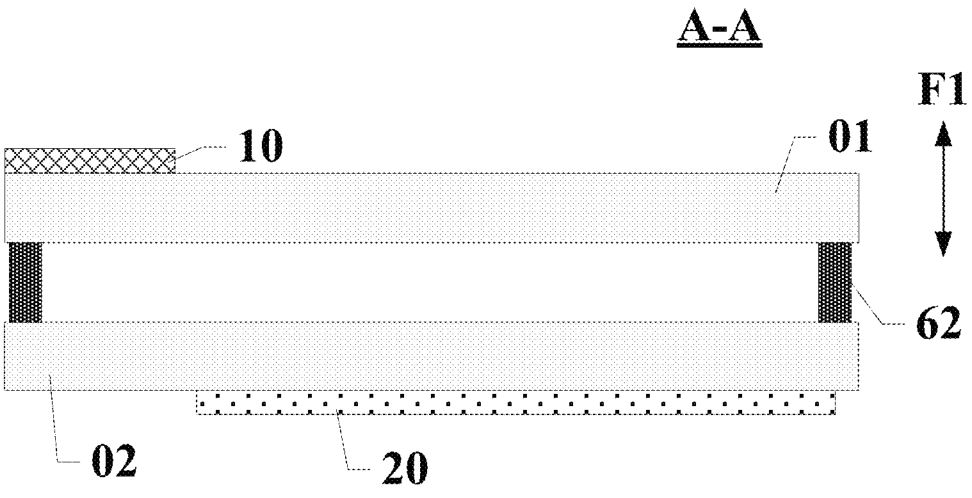
FIG. 16 illustrates another schematic of film layers along an AA direction of the antenna in FIG. 2 consistent with various disclosed embodiments of the present disclosure.

FIG. 16 is another schematic diagram of film layers of the antenna along the AA dire2.on in FIG. 2.

In one embodiment shown in FIG. 16, the substrate 00 may include a first substrate 01 and a second substrate 02 oppositely arranged along a first direction. The radiation electrode 10 may be located on a side of the first substrate 01 away from the second substrate 02, and the first dummy electrode 20 may be located on another side of the second substrate 02 away from the first substrate 02.

Specifically, when the radiation electrode 10 and the first dummy electrode 20 are respectively arranged on two different substrates 00 and the two substrates 00 are arranged to be boxed or fixed, the radiation electrode 10 and the first dummy electrode 20 may be respectively located on outer sides of the opposite first substrate 01 and second substrate 02. At this time, along the direction perpendicular to the plane where the first substrate 01 and the second substrate 02 are located, that is, along the first direction F1, a distance between the radiation electrode 10 and the dummy electrodes 20 may increase, and the coupling of the first dummy electrode 20 to the radio frequency signal of the radiation electrode 10 may be greatly reduced. Therefore, even along an arrangement direction of the radiation electrode 10 and the first dummy electrode 20, the distance between the radiation electrode 10 and the first dummy electrode 20 is reduced to further reduce or avoid the edge shadow problem of the radiation electrode 10, the coupling of the first dummy electrode 20 to the radio frequency signal of the radiation electrode 10 may be still reduced or avoided. Therefore, the radiation efficiency of the radiation electrode 10 may be ensured.

Further, when the radiation electrode 10 and the first dummy electrode 20 are respectively disposed on different substrates, the process of fabricating the radiation electrode 10 on the first substrate 01 and the process of fabricating the first dummy electrode 20 on the second substrate 02 may be performed simultaneously, which is beneficial to simplify the production process of the radiation electrode 10 and the first dummy electrode 20 and improve the production efficiency. Moreover, since the radiation electrodes 10 and the first dummy electrodes 20 are respectively formed on different substrates, before the first substrate 01 and the second substrate 02 are boxed or bonded, the first substrates 01 and the second substrate 02 with electrodes may be able to be detected respectively. When one of the substrates is abnormally detected, it may be only necessary to process or discard the problematic substrate, and another substrate that is detected to be normal may be used normally without discarding. Therefore, disposing the radiation electrode 10 and the first dummy electrode 20 respectively on different substrates may be beneficial to saving production costs.

Figure 17:
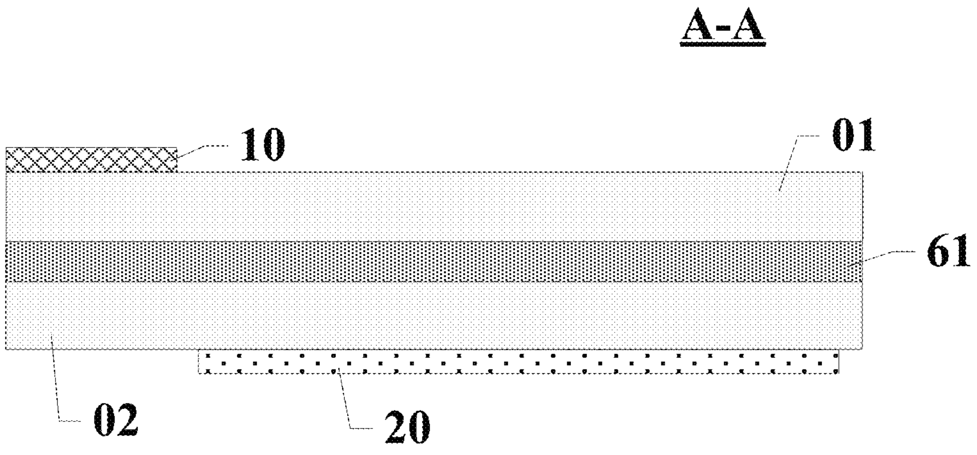
FIG. 17 illustrates another schematic of film layers along an AA direction of the antenna in FIG. 2 consistent with various disclosed embodiments of the present disclosure.

FIG. 17 is another schematic diagram of film layers of the antenna along the AA dire2.on in FIG. 2.

In one embodiment shown in FIG. 17, the first substrate 01 and the second substrate 02 may be bonded by an adhesive material 61.

Specifically, when the antenna includes a first substrate 01 and a second substrate 02 that are oppositely arranged, the space between the first substrate 01 and the second substrate 02 may be a hollow structure. Deformation may occur when an external force acts on the antenna, affecting the radiation performance. In this embodiment, the adhesive material 61 may be used to bond the first substrate 01 and the second substrate 02, to avoid a hollow space between the first substrate 01 and the second substrate 02. Correspondingly, the thickness of the interval between the first substrate 01 and the second substrate 02 may be consistent, to prevent the deformation of the antenna because of the existence of the hollow space after being subjected to an external force and to ensure the radiation performance of the antenna.

Optionally, the adhesive material 61 used to bond the first substrate 01 and the second substrate 02 may be a transparent adhesive such as OCA adhesive.

Figure 18:
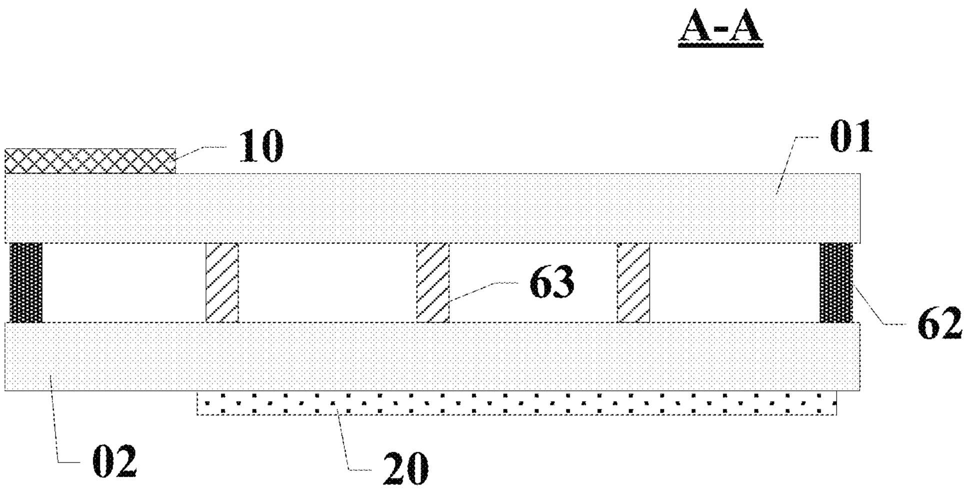
FIG. 18 illustrates another schematic of film layers along an AA direction of the antenna in FIG. 2 consistent with various disclosed embodiments of the present disclosure.

FIG. 18 is another schematic diagram of film layers of the antenna along the AA dire2.on in FIG. 2.

In one embodiment shown in FIG. 18, the frame regions of the first substrate 01 and the second substrate 02 may be bonded by a sealant 62, and a support structure 63 may be also provided between the first substrate 01 and the second substrate 02.

In the present embodiment, another way may be used to fix the first substrate 01 and the second substrate 02. Specifically, the frame regions of the first substrate 01 and the second substrate 02 may be bonded through the sealant 62. Further, to ensure the thickness consistency of the space between the first substrate 01 and the second substrate 02, the support structure 63 may be further disposed between the first substrate 01 and the second substrate 02, such that the first substrate 01 and the second substrate 02 may not be deformed even if the antenna is subjected to an external force because of the support function of the support structure 63. Therefore, the consistency of the thickness of the space between the first substrate 01 and the second substrate 02 may be ensured, to improve the radiation performance of the antenna.

Figure 19:
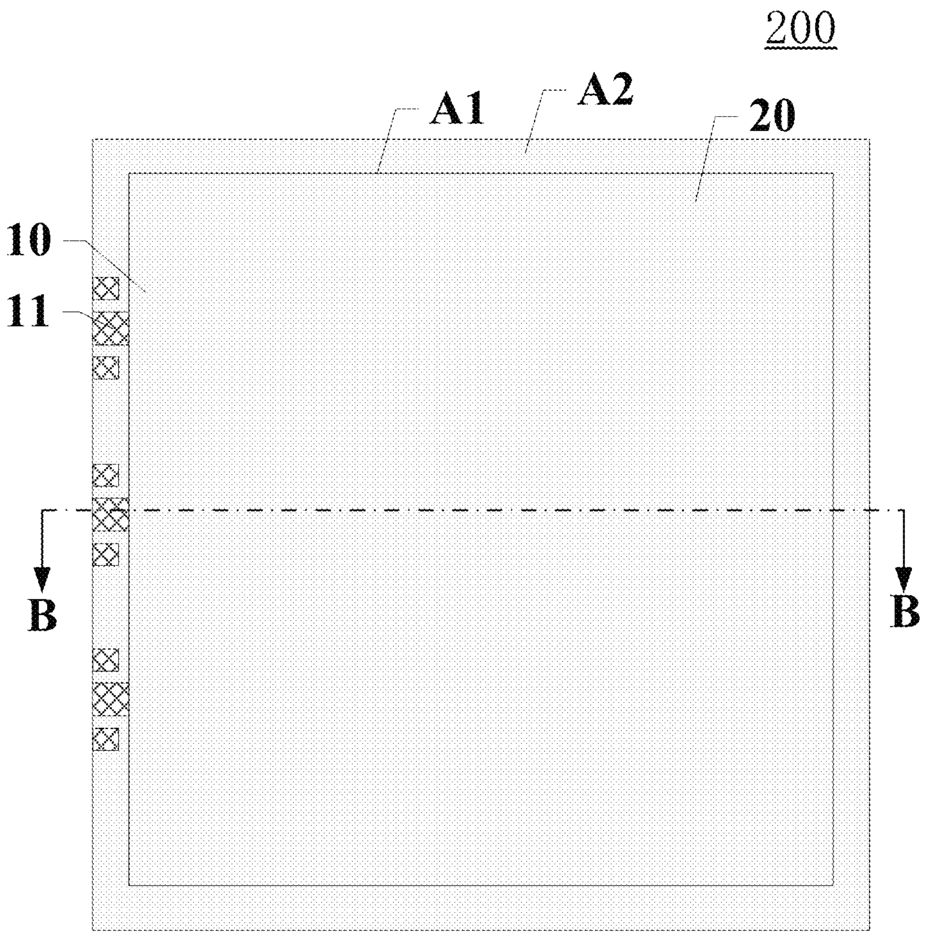
FIG. 19 illustrates a planar structure of an exemplary display device consistent with various disclosed embodiments of the present disclosure.
Figure 20:
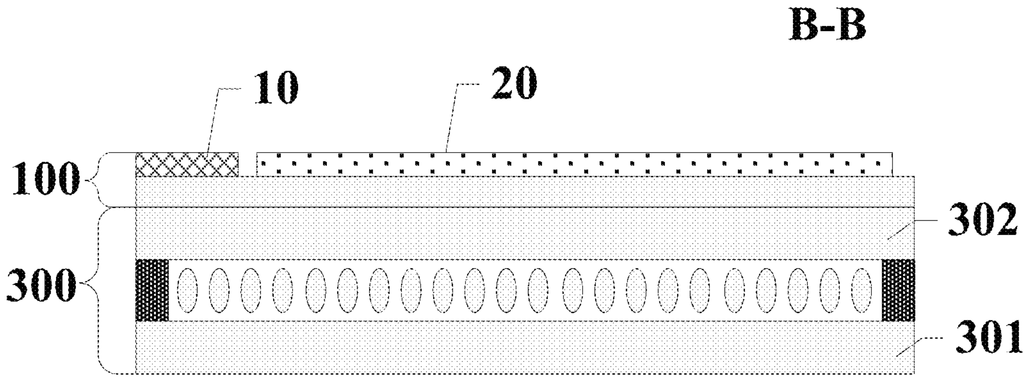
FIG. 20 illustrates a schematic of film layers along a BB direction of the display device in FIG. 19 consistent with various disclosed embodiments of the present disclosure.

The present disclosure also provides a display device. FIG. 19 is a schematic plan view of a display device provided by an embodiment of the present disclosure, and FIG. 20 is a schematic view of film layers of the display device in FIG. 19 along a BB direction. As shown in FIG. 19 and FIG. 20, in one embodiment, the display device 200 may include a display panel 300 and an antenna 100 provided in any one of the above-mentioned embodiments of the present disclosure. The radiation electrode 10 and the first dummy electrode 20 may be at least disposed in a display area A1 of the display device.

When the antenna 100 is introduced into the display device, in the present embodiment, the antenna 100 may be disposed on the light-emitting surface of the display panel 300, and the radiation electrode 10 and the first dummy electrode 20 in the antenna may be disposed in the display area of the display device. Therefore, the display device may have a communication function, and also the phenomenon that the antenna is blocked during the use of the display device and the performance of the antenna is affected may be avoided. Optionally, when the radiation electrode 10 and the first dummy electrode 20 in the antenna are arranged in the display area of the display device, the radiation electrode 10 and the first dummy electrode 20 as a whole may be arranged in the entire display area A1. By introducing the first dummy electrode 20, the light of the display panel in the display device may pass through the radiation electrode 10 arranged in the radiation area and the first dummy electrode 20 arranged in the non-radiation area when it is incident on the light-emitting surface of the display device. Therefore, the visual difference between the radiation area and the non-radiation area may be reduced, and the shadow of the edge of the radiation electrode 10 may be reduced. Also, the problem that the edge of the radiation electrode 10 may be visible when the antenna is applied to the display device may be prevented, to improve the overall display performance of the display device.

Figure 21:
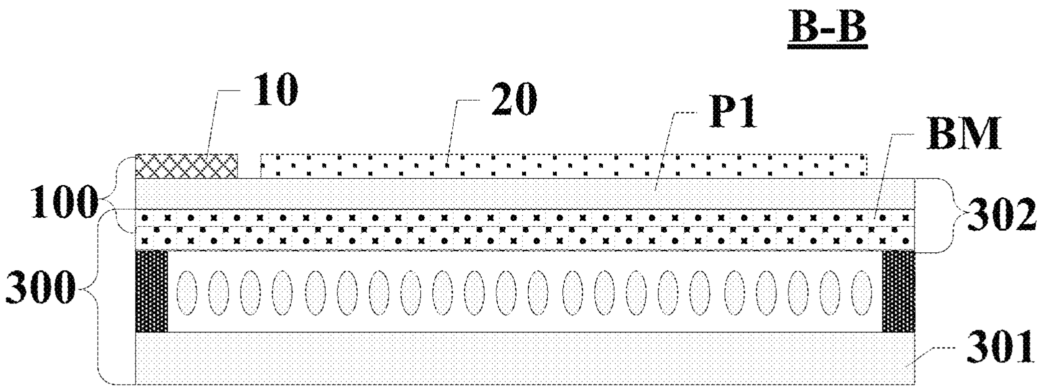
FIG. 21 illustrates another schematic of film layers along a BB direction of the display device in FIG. 19 consistent with various disclosed embodiments of the present disclosure.

In another embodiment shown in FIG. 21 which is another schematic diagram of film layers of the display device in FIG. 19 along the BB direction, the display device may be a liquid crystal display device.

As shown in FIG. 21, in the present embodiment, the display panel 300 may include an array substrate 301 and a color filter substrate 302 that are oppositely arranged. The color filter substrate 302 may include a first substrate P1, and the first substrate P1 may be multiplexed as a substrate for the antenna. The radiation electrode 10 may be located on the side of the first substrate P1 away from the array substrate 301.

Specifically, the first substrate P1 in the color filter substrate 302 may be multiplexed as the substrate of the antenna. When actually manufacturing the color filter substrate 302 of the display device, structures including the radiation electrode 10 and the first dummy electrode 20 of the antenna may be formed on the first substrate P1, and then other film layers in the color filter substrate 302 may be fabricated on the first substrate P1. In this way, there may be no need to separately introduce a new substrate 00 for the antenna, and the antenna 100 and the color filter substrate 302 may share the same first substrate P1. The overall film layer structure of the display device may be reduced, thereby reducing the thickness of the display device. This enables the display device to better meet the demand for thinning.

As shown in FIG. 11 and FIG. 21, in one embodiment, the feeder 11, the radiation electrode 10 and the first dummy electrode 20 in the antenna may be arranged on one side of the first substrate P1 away from the array substrate 301. This embodiment is used as an example only to illustrate the present disclosure and does not limit the scope of the present disclosure. The actual position of the first dummy electrode 20 is not limited.

Figure 22:
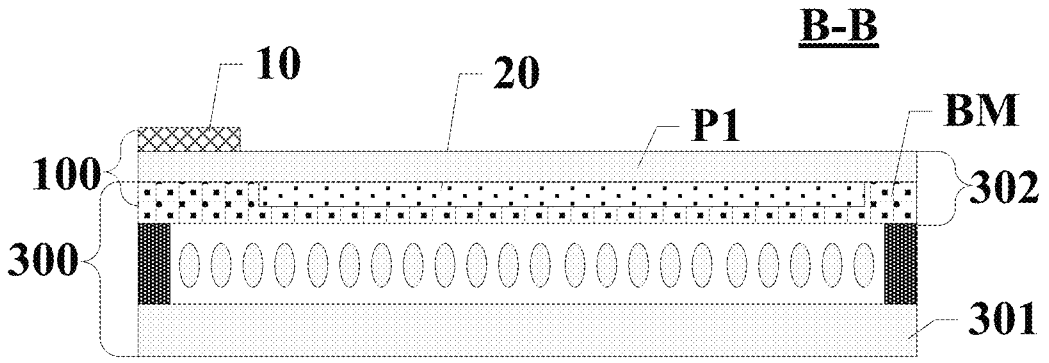
FIG. 22 illustrates another schematic of film layers along a BB direction of the display device in FIG. 19 consistent with various disclosed embodiments of the present disclosure.

In another embodiment shown in FIG. 22 which is another schematic diagram of film layers of the display device in FIG. 19 along the BB direction, the first substrate P1 of the color filter substrate 302 may be multiplexed as the substrate 00.

In the present embodiment, the color filter substrate 302 may include a black matrix BM, and the black matrix BM may be located on a side of the first substrate P1 facing the array substrate 301. As shown in FIG. 21, the first dummy electrode 20 may be located on the side of the first substrate P1 facing away from the array substrate 301. In another embodiment, alternatively, as shown in FIG. 22, the first dummy electrode 20 may be located between the first substrate P1 and the black matrix BM.

Specifically, in the embodiment shown in FIG. 21, both the radiation electrode 10 and the first dummy electrode 20 may be arranged on the side of the first substrate P1 away from the array substrate 301. The first dummy electrode 20 and the radiation electrode 10 may be simultaneously formed on the side of the substrate P1 facing away from the array substrate 301, which may simplify the overall manufacturing process of the display device.

In the embodiment shown in FIG. 22, the radiation electrode 10 may be arranged on the side of the first substrate P1 away from the array substrate 301, and the first dummy electrode 20 may be arranged between the first substrate P1 and the black matrix BM. In the actual manufacturing process, the radiation electrode 10 may be formed on one side surface of the first substrate P1 first, and then the first dummy electrode 20 may be formed on the other side surface of the first substrate P1. Or, the first dummy electrode 20 may be formed on the first substrate P1 first, and then the radiation electrode 10 may be formed on the other side of the first substrate P1. When the radiation electrode 10 and the first dummy electrode 20 are arranged on different sides of the first substrate P1, the distance between the radiation electrode 10 and the first dummy electrode 20 along the direction perpendicular to the plane where the first substrate P1 is located may be increased, to reduce the coupling of the first dummy electrode 20 to the radio frequency signal on the radiation electrode 10 and ensure the radiation performance of the antenna while weakening the edge shadow of the radiation electrode 10.

It should be noted that when the first dummy electrode 20 is provided on the side of the first substrate P1 facing the array substrate 301, after completing the fabrication of the antenna-related structures such as the radiation electrode 10 and the first dummy electrode 20 on the first substrate P1, other film layers of the color filter substrate 302, such as black matrix BM, color resist, etc., may be fabricated on the side of the first substrate P1 facing the array substrate 301.

Figure 23:
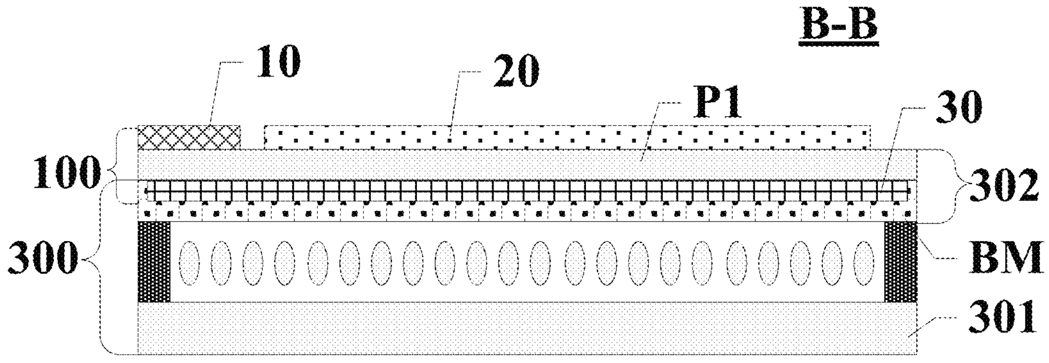
FIG. 23 illustrates another schematic of film layers of the display device consistent with various disclosed embodiments of the present disclosure.

In another embodiment shown in FIG. 23 which is another schematic diagram of film layers of the display device, the first substrate P1 of the color filter substrate 302 may be multiplexed as the substrate 00 of the antenna.

In the embodiment shown in FIG. 23, the first dummy electrode 20 may be disposed on the side of the first substrate P1 away from the array substrate 301, and the antenna 100 may further include a second dummy electrode 30 located between the first substrate P1 and the black matrix BM.

In the present embodiment, the radiation electrode 10 and the first dummy electrode 20 may be arranged on the sides of the first substrate P1 of the color filter substrate 302 away from the array substrate 301, and a second dummy electrode 30 may be provided on one side of the first substrate P1 away from the first dummy electrode 20 and the radiation electrode 20. Optionally, when the radiation electrode 10 and the first dummy electrode 20 are introduced on the side of the first substrate P1 away from the array substrate 301, the radiation electrode 10 and the first dummy electrode 20 may be distributed in the entire display area of the display panel. When the second dummy electrode 30 is disposed on the side of the first substrate P1 facing the array substrate 301, the second dummy electrodes 30 may be distributed in the entire display area of the display panel. The light emitted through the display panel may pass through the second dummy electrode 30 and then exit from the area where the radiation electrode 10 and the first dummy electrode 20 are located. Since the second dummy electrode 30 is arranged in the entire display area, the reflectivity of the radiation area corresponding to the display area and the reflectivity of the non-radiation area may be as consistent as possible, reducing the problem of uneven brightness and darkness caused by the difference of reflectivity in different regions, and thus is beneficial to improve the display uniformity of the display device.

Figure 24:
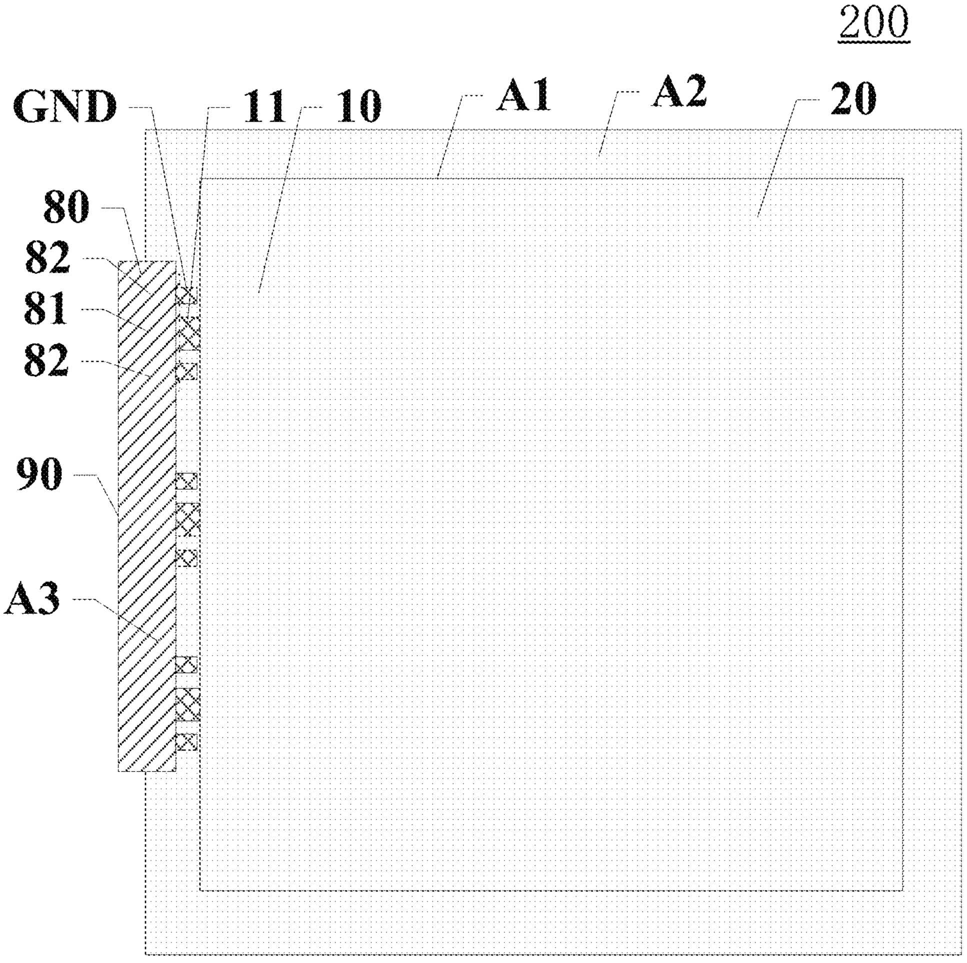
FIG. 24 illustrates a planar structure of another exemplary display device consistent with various disclosed embodiments of the present disclosure.

FIG. 24 is a schematic plan view of another display device provided by one embodiment of the present disclosure.

As shown in FIG. 24, in one, the display device includes a coupling area A3, and the coupling area A3 is located at the periphery of the display area, that is, in the non-display area A2 of the display device. The display device may also include a coplanar waveguide structure 80 and a flexible circuit board 90. The coplanar waveguide structure 80 may be located in the coupling area A3, and may be coupled with the feed line 11. The flexible circuit board 90 may be electrically connected with the coplanar waveguide structure 80, and the flexible circuit board 90 may be used to transmit radio frequency signal to the radiation electrode In another embodiment as shown in FIG. 24, the coplanar waveguide structure 80 may include a central conductor strip 81 and two conductor planar structures 82, and the two conductor planar structures 82 may be located on both sides of the central conductor strip 81, and the feed line 11 and the central conductor strip 81 may be electrically connected, and the radiation electrode 10 may be coupled to the central conductor strip 81 of the coplanar waveguide structure 80 through the feed line 11. The feed line 11 and the coplanar waveguide structure 80 may be responsible for transmitting radio frequency signals between the feedback 1 line 11 and the radiation electrode 10. Optionally, the antenna may further include a ground terminal GND located on both sides of the feed line 11. The ground terminal GND and the feed line 11 may be both located in the non-display area A2, and the conductor plane structure 82 in the coplanar waveguide structures 80 and the ground terminal GND may be electrically connected correspondingly.

The coupling area A3 may be the area of the display device that couples and transmits signals to or receives signals from the antenna, where the coplanar waveguide structures 80 and the feed line 11 are coupled to form a coupling, and the signal may be transmitted in the form of a waveguide. Optionally, the coupling area A3 may be located in the non-display area A2 of the display device.

Optionally, the flexible circuit board 90 may be also electrically connected to a feed source (not shown in the figure). The feed source may be a primary radiation source that provides electromagnetic radiation to the antenna, and its function may be to convert high-frequency current or waveguide energy into electromagnetic radiation. The flexible circuit board 90 may be responsible for transmitting high-frequency current or waveguide energy to the coplanar waveguide structures 80, and the coplanar waveguide structures 80 may transmit electromagnetic signals to the feeder 11 and the radiation electrode 10 in the form of a waveguide. Optionally, the feed source may be integrated on the main board of the display device, and the main board may send signals to and receive signals from the antenna through the feed source.

In one embodiment, the flexible circuit board 90 may be also used to provide display signals to the display panel. By introducing the flexible circuit board 90, the flexible circuit board 90 may be used to provide display signals to the display panel and transmit electromagnetic signals to the antenna simultaneously. There may be no need to introduce different flexible circuit boards into the display device to transmit electromagnetic signals and display signals respectively, therefore facilitating the simplification of the structure of the display device.

Figure 25:
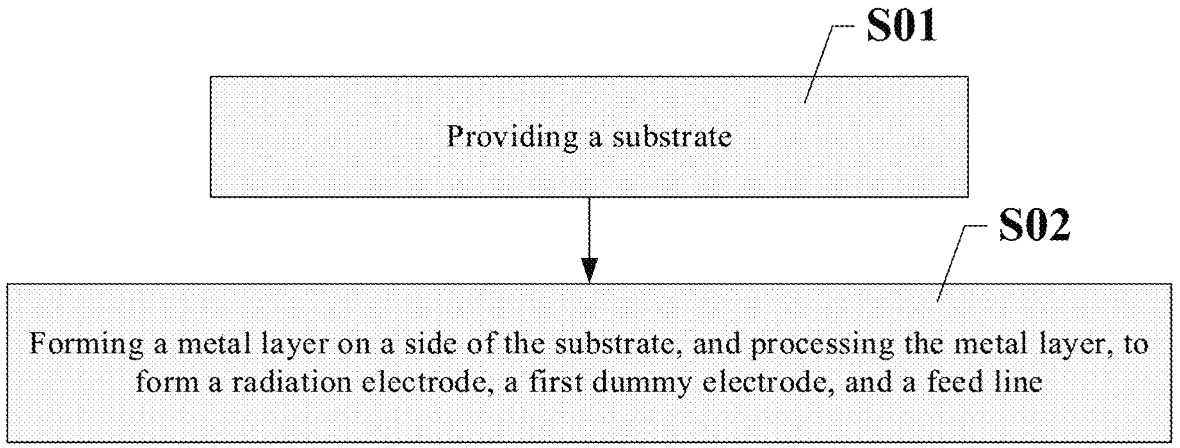
FIG. 25 illustrates an exemplary fabrication method of an antenna consistent with various disclosed embodiments of the present disclosure.

The present disclosure also provides a fabrication method of an antenna. As shown in FIG. 25, the method may include:

S01: providing a substrate 00; and

S02: depositing a metal layer M on a side of the substrate 00, and processing the metal layer M to form a radiation electrode 10, a first dummy electrode 20, and a feed line 11.

Figure 26:
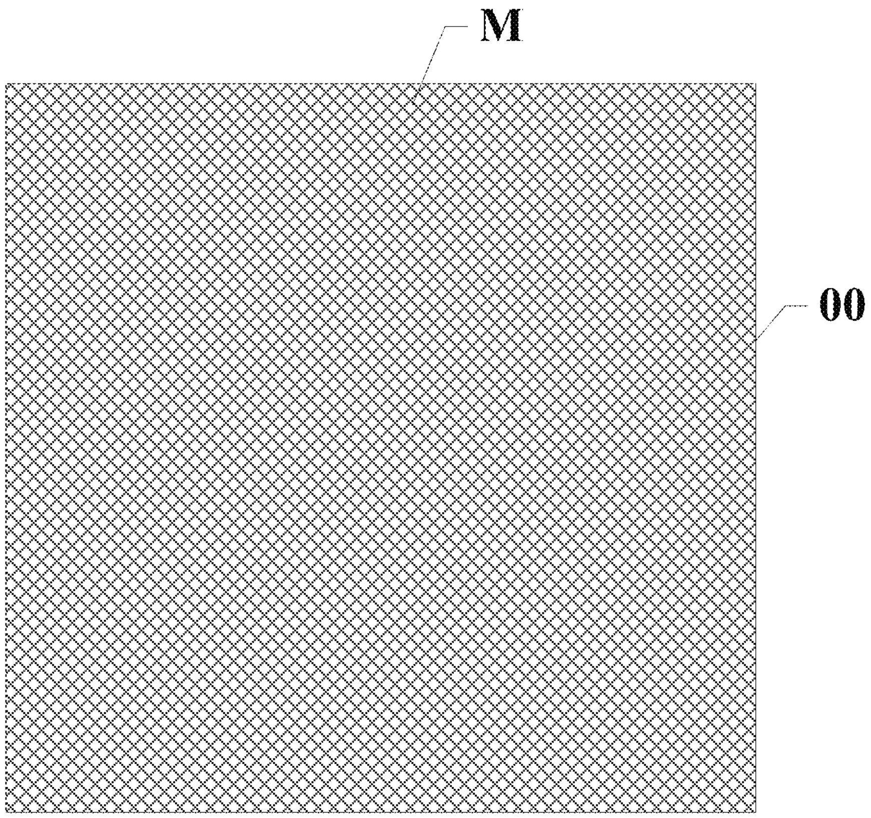
FIG. 26 illustrates a schematic of depositing metal layers on a same side of a substrate consistent with various disclosed embodiments of the present disclosure.
Figure 27:
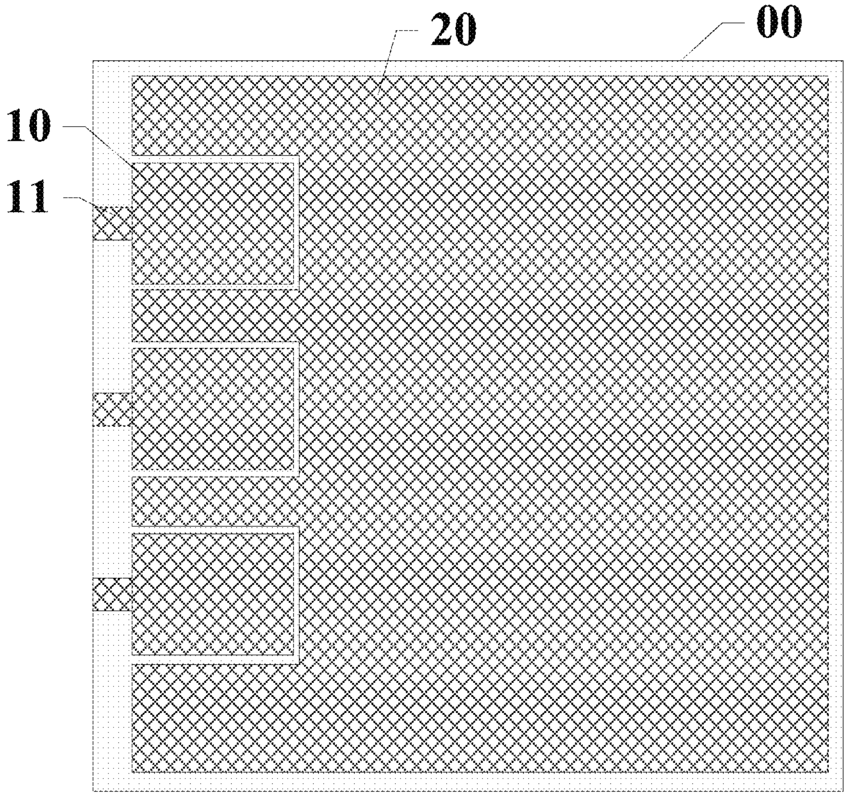
FIG. 27 illustrates a schematic of processing the metal layers to form a radiation electrode, a first dummy electrode, and a feed lines, consistent with various disclosed embodiments of the present disclosure.

FIG. 26 is a schematic diagram of depositing the metal layer M on the side of the substrate 00, and FIG. 27 is a schematic diagram of processing the metal layer M to form the radiation electrode 10, the first dummy electrode 20, and the feed line 11. In one embodiment, the antenna may further include a ground terminal GND shown in FIG. 2, and the ground terminal GND may be formed at the same time as the radiation electrode 10 and the feed line 10.

In the present embodiment, the metal layer M may be deposited on one side of the substrate 00 by a process including magnetron sputtering, thermal evaporation, or chemical vapor deposition. The metal layer M may be processed by, for example, exposure, development, etching, or photoresist removal. Optionally, the radiation electrode 10 and the dummy electrode may be made of metal materials, such as copper, aluminum, silver, gold, etc., and may also be made of alloy materials with low square resistance such as silver-palladium-copper. By controlling the width of the lines in the grid structure, the size of the hollow holes, etc., the transmittance of the antenna may be adjusted to avoid the influence on the light emitted by the display panel.

In the manufacturing method of the antenna provided in this embodiment, the radiation electrode 10, the first dummy electrode 20, and the feed line 11 may be formed simultaneously on the same side of the substrate 00 using the same production process, which is beneficial to simplify the production process of the antenna and improve the productivity of the antenna.

Figure 28:
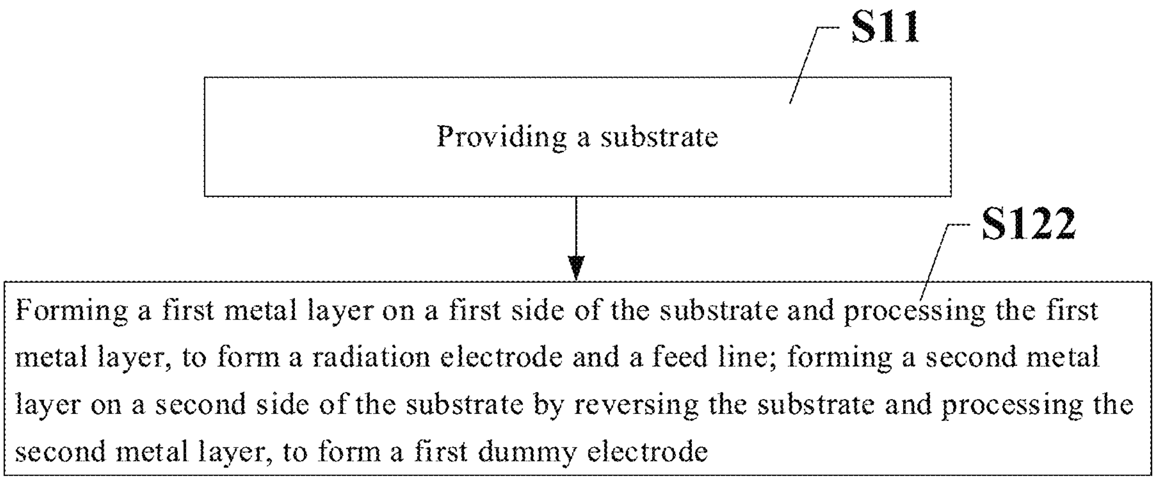
FIG. 28 illustrates another exemplary fabrication method of an antenna consistent with various disclosed embodiments of the present disclosure.

In another embodiment shown in FIG. 28 which is another flow chart of the fabrication method of the antenna, the method my include:

S11: providing a substrate 00; and

Figure 29:
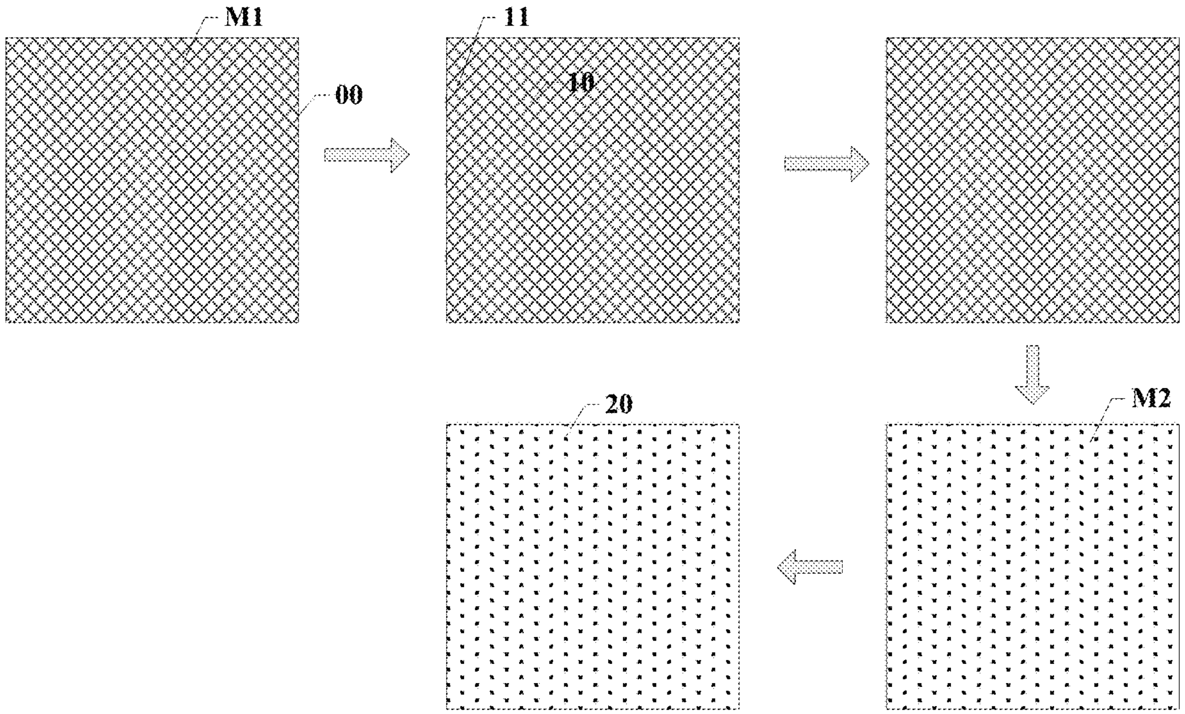
FIG. 29 illustrates a process of forming a radiation electrode and a first dummy electrode on two sides of a substrate respectively, consistent with various disclosed embodiments of the present disclosure.

S121: depositing a first metal layer M1 on a side of the substrate 00, and processing the first metal layer M1 to form a radiation electrode 10 and a feed line 11; then depositing a second metal layer M2 on another side of the substrate 00 by reversing the substrate 00, and processing the second metal layer M2 to form a first dummy electrode 20, as shown in FIG. 28 and FIG. 29. In one embodiment, the antenna may further include a ground terminal GND shown in FIG. 2, and the ground terminal GND may be formed at the same time as the radiation electrode 10 and the feed line 10.

Figure 30:
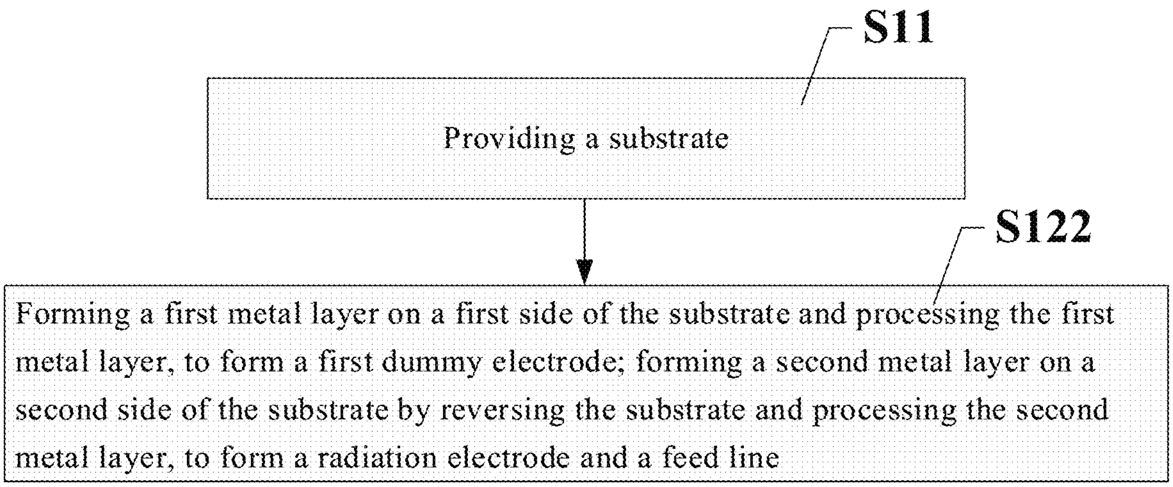
FIG. 30 illustrates another exemplary fabrication method of an antenna consistent with various disclosed embodiments of the present disclosure.

In another embodiment shown in FIG. 30 which is another flow chart of the fabrication method of the antenna, the method my include:

S11: providing a substrate 00; and

Figure 31:
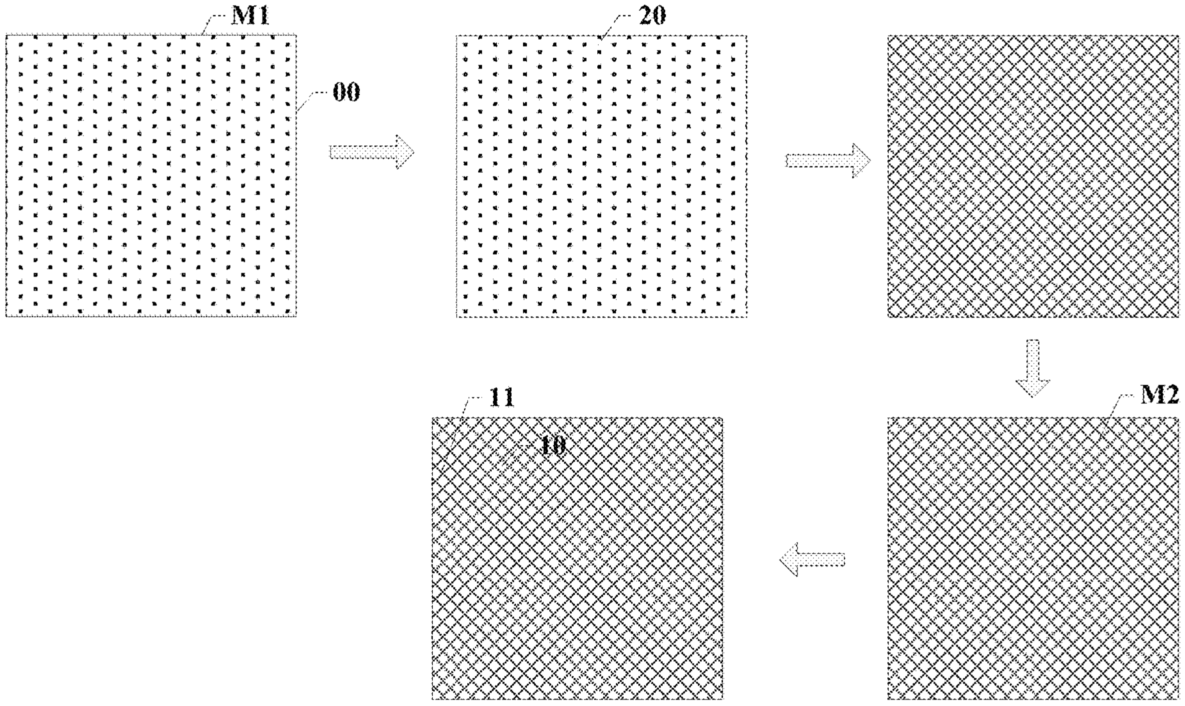
FIG. 31 illustrates another process of forming a radiation electrode and a first dummy electrode on two sides of a substrate respectively, consistent with various disclosed embodiments of the present disclosure.

S122: depositing a first metal layer M1 on a side of the substrate 00, and processing the first metal layer M1 to form a first dummy electrode 20; then depositing a second metal layer M2 on another side of the substrate 00 by reversing the substrate 00, and processing the second metal layer M2 to form radiation electrode 10 and a feed line 11, as shown in FIG. 30 and FIG. 31. In one embodiment, the antenna may further include a ground terminal GND shown in FIG. 2, and the ground terminal GND may be formed at the same time as the radiation electrode 10 and the feed line 10.

In the present embodiment, the first metal layer M1 and the second metal layer M2 may be deposited on one side of the substrate 00 by a process including magnetron sputtering, thermal evaporation, or chemical vapor deposition. The first metal layer M1 and the second metal layer M2 may be processed by, for example, exposure, development, etching, or photoresist removal. Optionally, the radiation electrode 10 and the dummy electrode may be made of metal materials, such as copper, aluminum, silver, gold, etc., and may also be made of alloy materials with low square resistance such as silver-palladium-copper. By controlling the width of the lines in the grid structure, the size of the hollow holes, etc., the transmittance of the antenna may be adjusted to avoid the influence on the light emitted by the display panel.

When fabricating the radiation electrode 10 and the first dummy electrode 20 on opposite sides of the same substrate 00 respectively, the radiation electrode 10 may be fabricated on one side of the substrate 00 first, and then the first dummy electrode 20 may be fabricated on the other side; or the first dummy electrode 20 may be fabricated first on one side of the substrate 00, and then the radiation electrode 10 may be fabricated on the other side.

In this embodiment, when the first dummy electrode 20 and the radiation electrode 10 are arranged on different sides of the substrate 00, the distance of the first interval between the radiation electrode 10 and the first dummy electrode 20 may be accurately controlled, to weaken the edge shadow of the radiation electrode 10. Further, the coupling of the first dummy electrode 20 to the radio frequency signal on the radiation electrode 10 may be reduced, thereby reducing the radiation loss of the radiation electrode 10.

Figure 32:
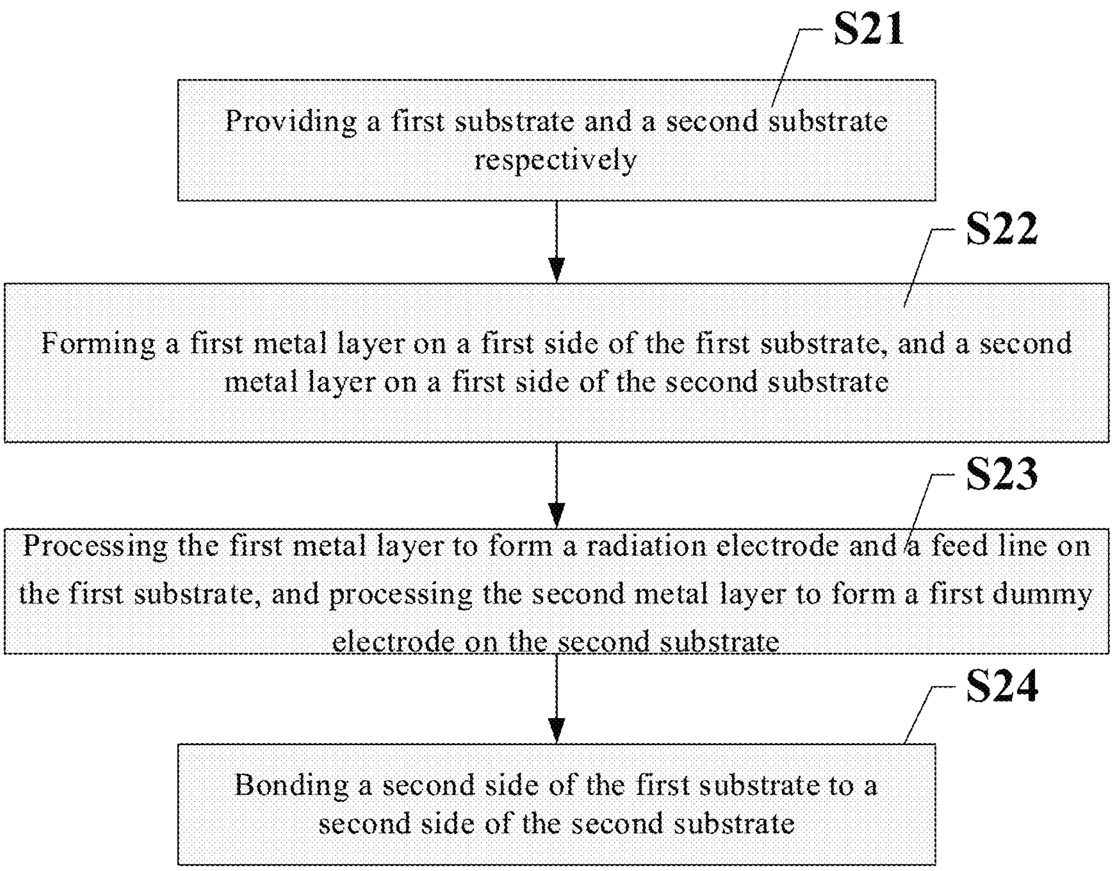
FIG. 32 illustrates another exemplary fabrication method of an antenna consistent with various disclosed embodiments of the present disclosure.
Figure 33:
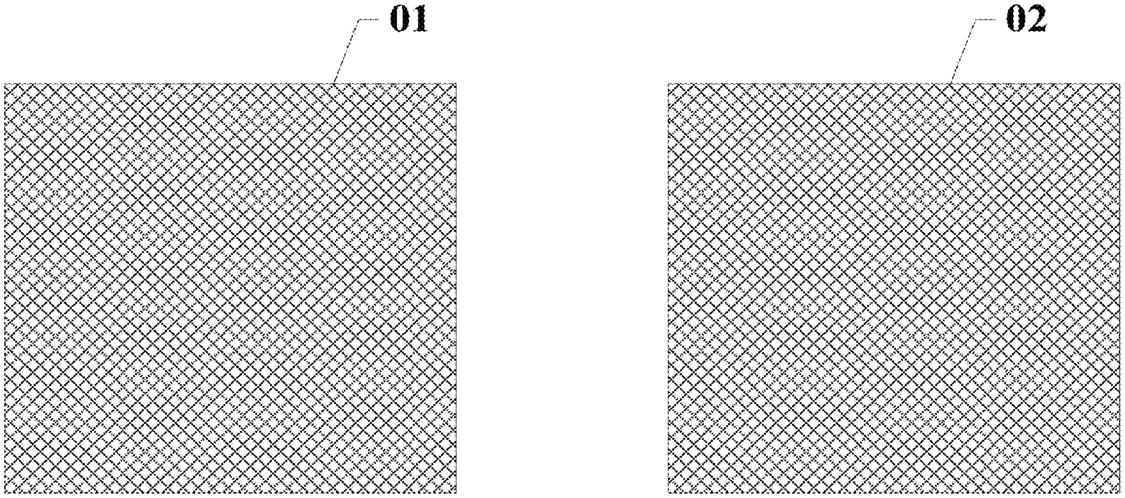
FIG. 33 illustrates a structure of a first substrate and a second substrate, consistent with various disclosed embodiments of the present disclosure.
Figure 34:
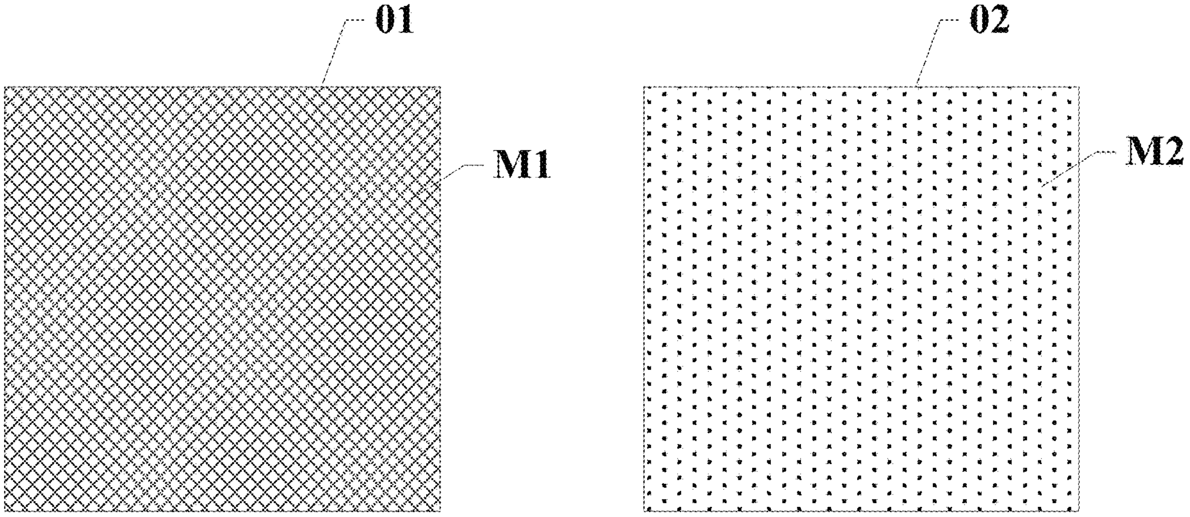
FIG. 34 illustrates a schematic structure of depositing metal layers on the first substrate and the second substrate respectively, consistent with various disclosed embodiments of the present disclosure.
Figure 35:
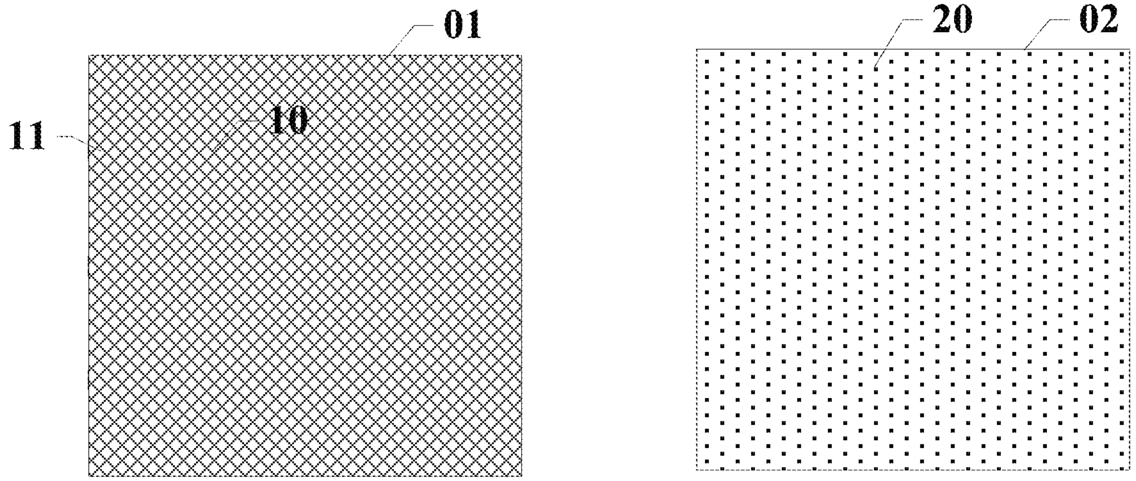
FIG. 35 illustrates a process of forming a radiation electrode and a feed line on the first substrate, and a first dummy electrode on the second substrate, respectively, consistent with various disclosed embodiments of the present disclosure.
Figure 36:
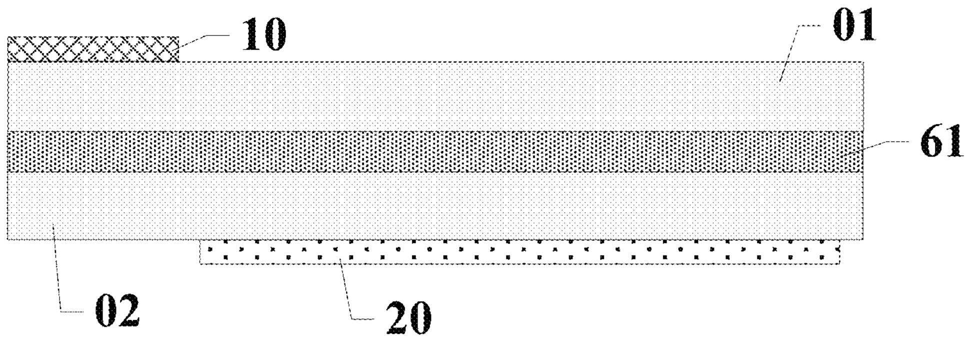
FIG. 36 illustrates a process of attaching the first substrate and the second substrate, consistent with various disclosed embodiments of the present disclosure.

In another embodiment shown in FIG. 32 which is another flow chart of the fabrication method of the antenna, the method my include:

- S21: providing a first substrate 01 and a second substrate 02 as shown in FIG. 33;
- S22: depositing a first metal layer M1 on a side of the first substrate 01; and depositing a second metal layer M2 on a side of the second substrate 02, as shown in FIG. 34;
- S23: processing the first metal layer M1 and the second metal layer M2 respectively, to form a radiation electrode 10 and a feed line 11 on the first substrate 01 and a first dummy electrode 20 on the second substrate 02, as shown in FIG. 35; and
- S24: bonding a second side of the first substrate 01 to a second side of the second substrate 02, as shown in FIG. 36. It should be noted that FIG. 36 only shows the solution of bonding the first substrate 01 and the second substrate 02 through an adhesive material 61. In some other embodiments, the first substrate 01 and the second substrate 02 may be bonded together by a sealant 62 as shown in FIG. 16 or FIG. 18, and a support structure 63 may also be introduced between the first substrate 01 and the second substrate 02, which is not limited in the present disclosure. In one embodiment, the antenna may further include a ground terminal GND shown in FIG. 2, and the ground terminal GND may be formed at the same time as the radiation electrode 10 and the feed line 10.

In the present embodiment, the first metal layer M1 and the second metal layer M2 may be deposited on one side of the substrate 00 by a process including magnetron sputtering, thermal evaporation, or chemical vapor deposition. The first metal layer M1 and the second metal layer M2 may be processed by, for example, exposure, development, etching, or photoresist removal. Optionally, the radiation electrode 10 and the dummy electrode may be made of metal materials, such as copper, aluminum, silver, gold, etc., and may also be made of alloy materials with low square resistance such as silver-palladium-copper. By controlling the width of the lines in the grid structure, the size of the hollow holes, etc., the transmittance of the antenna may be adjusted to avoid the influence on the light emitted by the display panel.

In the present embodiment, the radiation electrode 10 and the first dummy electrode 20 may be respectively formed on two substrates 00 when the antenna includes two substrates 00. When the radiation electrode 10 and the first dummy electrode 20 are respectively formed on the first substrate 01 and the second substrate 02, the process of depositing the first metal layer M1 on the first substrate 01 and the process of depositing the second metal layer M2 on the second substrate 02 may be carried out simultaneously. The process of forming the feeder line 11 and the radiation electrode 10 on the substrate 01 and forming the first dummy electrode 20 on the second substrate 02 may be performed simultaneously. Therefore, the manufacturing process of the antenna may be simplified, improving the production efficiency of the antenna. When the radiation electrode 10 and the first dummy electrode 20 are respectively arranged on two different substrates 00 and the two substrates 00 are arranged to be boxed or fixed, the radiation electrode 10 and the first dummy electrode 20 may be respectively located on the opposite sides of the first substrate 01 and the second substrate 02. At this time, along the direction perpendicular to the plane where the first substrate 01 and the second substrate 02 are located, the distance between the radiation electrode 10 and the first dummy electrode 20 may increase, and the coupling of the first dummy electrode 20 to the radio frequency signal of the radiation electrode 10 may be greatly reduced. Therefore, even the distance between the radiation electrode 10 and the first dummy electrode 20 along the arrangement direction of the radiation electrode 10 and the first dummy electrode 20 is reduced to further reduce or avoid the edge shadow problem of the radiation electrode 10, the coupling of the first dummy electrode 20 to the radio frequency signal of the radiation electrode 10 may still be prevented, to ensure the radiation efficiency of the radiation electrode 10.

In the present disclosure, in addition to the radiation electrode, the antenna may also include a first dummy electrode. The area where the radiation electrode is located may be the effective radiation area, and the area where the first dummy electrode is located may be the non-radiation area. That is, the first dummy electrode may be disposed in the non-radiation area. There may be a first interval between the first dummy electrode and the radiation electrode. That is, the first dummy electrode and the radiation electrode may be insulated from each other, and the first dummy electrode may not play a role of radiation. When the first dummy electrode is introduced in the non-radiation area, the light from the display panel in the display device may pass through the radiation electrode disposed in the radiation area and the first dummy electrode disposed in the non-radiation area when it is incident on the light-emitting surface of the display device. Therefore, the visual difference between the radiation area and the non-radiation area may be reduced, to weaken the shadow of the edge of the radiation electrode. The problem that the edge of the radiation electrode is visible when the antenna is applied to a display device may be avoided, to improve the overall display effect of the display device.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. An antenna, comprising a substrate, a radiation electrode, a first dummy electrode, and a feed line, wherein:

the radiation electrode, the first dummy electrode, and the feed line are disposed on the substrate;

the feed line is coupled and connected to the radiation electrode;

the first dummy electrode and the radiation electrode are adjacent but not connected to each other;

along a first direction, an orthographic projection of the radiation electrode to a plane where the substrate is located is a first projection, and an orthographic projection of the first dummy electrode to the plane where the substrate is located is a second projection;

there is a first interval between the first projection and the second projection; and the first direction is perpendicular to the plane where the substrate is located.

2. The antenna according to claim 1, wherein:

the radiation electrode includes a plurality of first grids, and the plurality of first grids includes a plurality of first sub-grids adjacent to the first dummy electrode;

the first dummy electrode includes a plurality of second grids, and the plurality of second grids includes a plurality of second sub-grids adjacent to the radiation electrode; and along an arrangement direction of the radiation electrode and the first dummy electrode, a distance between the plurality of first sub-grids and the plurality of second sub-grids is D1, and a distance between the adjacent first grids of the plurality of first grids in the radiation electrodes is D2, wherein D1>D2.

3. The antenna according to claim 1, wherein:

along the arrangement direction of the adjacent radiation electrode and the first dummy electrode, a minimum width of the first interval is D0, wherein 3 μm≤D0≤10 μm.

4. The antenna according to claim 1, wherein:

the radiation electrode includes a plurality of first sub-grids adjacent to the first dummy electrode;

the first dummy electrode includes a plurality of second sub-grids adjacent to the radiation electrode;

in one of the plurality of first sub-grids, a number of vertices is V1 and a number of edges is E1;

in one of the plurality of second sub-grids, a number of vertices is V2 and a number of edges is E2; and $$V1-E1=V2-E2.$$

5. The antenna according to claim 1, wherein:

the radiation electrode includes a plurality of first sub-grids adjacent to the first dummy electrode;

the first dummy electrode includes a plurality of second sub-grids adjacent to the radiation electrode;

one of the plurality of first sub-grid includes a first sub-section and at least one second sub-section connected to each other;

at least one of the at least one second sub-section is located on a side of the first sub-section away from one corresponding second sub-grid of the plurality of second sub-grids;

one of the plurality of second sub-grids includes a third sub-section and at least one fourth sub-section;

at least one of the at least one fourth sub-section is located on a side of the third sub-section away from one corresponding first sub-grid of the plurality of first sub-grids; and the first sub-section is adjacent to the third sub-section, and the first interval is an interval between the first sub-section and the third sub-section.

6. The antenna according to claim 5, wherein:

a shape of the first sub-section and a shape of the third sub-section are fitted or symmetrical to each other; or the first sub-section and the third sub-section are straight line segments parallel to each other; or the first sub-section and the third sub-section are polyline segments.

7. The antenna according to claim 5, wherein:

the first sub-section is a straight line segment or a polyline segment, and the third sub-section is an arc line segment recessed toward a center of the second sub-grid.

8. The antenna according to claim 1, wherein:

both the radiation electrode and the first dummy electrode are located on a first side of the substrate.

9. The antenna according to claim 8, further comprising a second dummy electrode, wherein:

the second dummy electrode is located on a second side of the substrate, wherein the first side and the second side are opposite to each other along the first direction.

10. The antenna according to claim 9, wherein:

the first dummy electrode is floating, and the second dummy electrode receives a fixed potential signal.

11. The antenna according to claim 1, wherein:

the radiation electrode is located on a first side of the substrate; and the first dummy electrode is located on a second side of the substrate, wherein the first side and the second side are opposite to each other along the first direction.

12. The antenna according to claim 11, wherein:

reflective layers are disposed on a side of the radiation electrode away from the substrate and on a side of the first dummy electrode closed to the substrate.

13. The antenna according to claim 1, wherein:

the substrate includes a first substrate and a second substrate oppositely disposed along the first direction;

the radiation electrode is located on a side of the first substrate away from the second substrate; and the first dummy electrode is located on a side of the second substrate away from the first substrate.

14. The antenna according to claim 13, wherein:

the first substrate and the second substrate are bonded by glue; or frame areas of the first substrate and the second substrate are bonded together by a frame glue, and a supporting structure is also disposed between the first substrate and the second substrate.

15. A display device, comprising:

the antenna according to claim 1, wherein:

the radiation electrode and the first electrode are at least disposed in a display area of the display device.

16. The display device according to claim 15, further comprising an array substrate and a color filter substrate opposite to each other, wherein:

the color filter substrate includes a first substrate;

the first substrate is multiplexed as the substrate of the antenna; and the radiation electrode is located on a side of the first substrate away from the array substrate.

17. The display device according to claim 16, wherein:

the color filter substrate includes a black matrix on a side of the first substrate facing the array substrate; and the first dummy electrode is located on the side of the first substrate away from the array substrate, or the first dummy electrode is located between the first substrate and the black matrix.

18. The display device according to claim 17, wherein:

the first dummy electrode is located on the side of the first substrate away from the array substrate; and the antenna further includes a second dummy electrode between the first substrate and the black matrix.

19. The display device according to claim 18, further comprising a coupling area at a periphery of the display area, a coplanar waveguide structure, and a flexible circuit board, wherein:

the coplanar waveguide structure is located in the coupling area and coupled with the feed line;

the flexible circuit board is electrically connected to the coplanar waveguide structure, and is used to transmit radio frequency signals to the radiation electrode;

the flexible circuit board is further used to transmit display signals to the display panel.

20. A fabrication method of the antenna according to claim 1, comprising:

forming a metal layer on a side of the substrate; and processing the metal layer, to form the radiation electrode, the first dummy electrode, and the feed line, of the antenna; or forming a first metal layer on a first side of the substrate; processing the first metal layer, to form the radiation electrode and the feed line; forming a second metal layer on a second side of the substrate after reversing the substrate; and processing the second metal layer, to form the first dummy electrode; or forming a first metal layer on a first side of the substrate; processing the first metal layer to form the first dummy electrode; forming a second metal layer on a second side of the substrate after reversing the substrate; and processing the second metal layer, to form the radiation electrode and the feed line; or providing a first substrate and a second substrate, respectively; forming a first metal layer on a first side of the first substrate, and a second metal layer on a first side of the second substrate; processing the first metal layer to form the radiation electrode and the feed line on the first substrate; processing the second metal layer to form the first dummy electrode on the second substrate; and bonding a second side of the first substrate to a second side of the second substrate.

* * * * *